United States Patent
Lee et al.

(10) Patent No.: US 9,120,283 B2
(45) Date of Patent: *Sep. 1, 2015

(54) ASSEMBLIES AND METHODS FOR PROCESSING WORKPIECES IN RAM-DRIVEN PRESSES

(71) Applicant: Wilson Tool International Inc., White Bear Lake, MN (US)

(72) Inventors: Brian J. Lee, Elk River, MN (US); Timothy J. Mika, Amery, WI (US)

(73) Assignee: Wilson Tool International Inc., White Bear Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,663

(22) Filed: Aug. 12, 2013

(65) Prior Publication Data

US 2013/0333578 A1    Dec. 19, 2013

Related U.S. Application Data

(63) Continuation of application No. 12/109,162, filed on Apr. 24, 2008, now Pat. No. 8,505,175.

(60) Provisional application No. 60/914,468, filed on Apr. 27, 2007.

(51) Int. Cl.
    *B30B 9/00* (2006.01)
    *B21D 28/00* (2006.01)
    (Continued)

(52) U.S. Cl.
    CPC . *B30B 9/00* (2013.01); *B21D 21/00* (2013.01); *B21D 28/002* (2013.01); *B21D 28/12* (2013.01);
    (Continued)

(58) Field of Classification Search
    CPC ............ B30B 9/00; B30B 15/08; B30D 1/32; B30D 1/38; B41F 19/007; B41F 19/008; Y10T 29/5155; Y10T 29/4995; Y10T 29/5128; Y10T 29/49897; B21D 25/12; B21D 25/26; B21D 25/002; B21D 25/125
    USPC .............. 483/7–12, 28, 29; 72/442, 446, 448; 347/49, 14, 74–76, 2, 37–39; 29/38 R–38 F, 38 A, 40; 901/43
    See application file for complete search history.

(56) References Cited

U.S. PATENT DOCUMENTS 3,788,760 A    1/1974  Daniels
3,847,078 A   11/1974  Krembel, Jr.
(Continued)

FOREIGN PATENT DOCUMENTS

DE    8508544    5/1985
EP    0394925    7/1994
(Continued)

OTHER PUBLICATIONS

English-language abstract for EP 1 219 439 (Bauer).
(Continued)

*Primary Examiner* — Jason L Vaughan
(74) *Attorney, Agent, or Firm* — Fredrikson & Byron, P.A.

(57) ABSTRACT

Assemblies and methods for processing a workpiece in a ram-driven press employ an active tool contained by a housing that is interchangeable with a passive forming tool assembly in a mounting assembly of the press. The active tool includes a microprocessor and a functional head coupled to the microprocessor. Some assemblies including the active tool include a switch for activating the functional head; the switch may be mounted to the housing such that, when the housing is mounted in the mounting assembly of the press, the switch is triggered by movement of the housing in response to the ram stroke of the press.

42 Claims, 22 Drawing Sheets

(51) Int. Cl.
   B21D 28/26 (2006.01)
   B23B 43/00 (2006.01)
   B23G 3/00 (2006.01)
   B41J 3/413 (2006.01)
   B21D 21/00 (2006.01)
   B21D 35/00 (2006.01)
   B21D 37/00 (2006.01)
   B23P 23/04 (2006.01)
   B41J 2/01 (2006.01)
   B23K 26/38 (2014.01)
   G01B 7/06 (2006.01)
   G01B 7/012 (2006.01)
   G01B 5/012 (2006.01)
   G03B 19/00 (2006.01)
   B23C 7/00 (2006.01)
   B21D 28/02 (2006.01)
   B21D 28/12 (2006.01)
   B23Q 3/155 (2006.01)
   B23Q 5/28 (2006.01)
   B41J 3/44 (2006.01)
   B41J 2/175 (2006.01)

(52) U.S. Cl.
   CPC ............... *B21D 28/26* (2013.01); *B23B 43/00* (2013.01); *B23G 3/005* (2013.01); *B41J 3/413* (2013.01); *B21D 28/02* (2013.01); *B21D 28/125* (2013.01); *B21D 35/001* (2013.01); *B21D 37/00* (2013.01); *B23C 7/00* (2013.01); *B23K 26/38* (2013.01); *B23P 23/04* (2013.01); *B23Q 5/28* (2013.01); *B23Q 2003/15586* (2013.01); *B41J 2/01* (2013.01); *B41J 2/17503* (2013.01); *B41J 3/445* (2013.01); *G01B 5/012* (2013.01); *G01B 7/012* (2013.01); *G01B 7/102* (2013.01); *G03B 19/00* (2013.01); *Y10T 29/49897* (2015.01); *Y10T 29/49995* (2015.01); *Y10T 29/5128* (2015.01); *Y10T 29/5155* (2015.01); *Y10T 483/13* (2015.01)

(56) References Cited

U.S. PATENT DOCUMENTS

| | | | |
|---|---|---|---|
| 4,656,463 A | 4/1987 | Anders |
| 4,742,470 A | 5/1988 | Juengel |
| 4,823,658 A | 4/1989 | Spicer |
| 5,046,014 A | 9/1991 | Anjo |
| 5,201,589 A | 4/1993 | Chun |
| 5,215,513 A | 6/1993 | Maynard |
| 5,224,915 A | 7/1993 | Kilian |
| 5,259,100 A | 11/1993 | Takahashi |
| 5,342,276 A | 8/1994 | Fujiwara |
| 5,451,195 A | 9/1995 | Fujiwara |
| 5,457,484 A | 10/1995 | Regnault |
| 5,555,759 A | 9/1996 | Rosene |
| 5,575,168 A | 11/1996 | Rosene |
| 5,682,657 A | 11/1997 | Hirose |
| 5,682,782 A | 11/1997 | Rosene |
| 5,721,587 A | 2/1998 | Hirose |
| 5,808,642 A | 9/1998 | Zaba |
| 5,810,704 A | 9/1998 | Seto |
| 5,993,090 A | 11/1999 | Straka |
| 7,011,613 B2 | 3/2006 | Moller |
| 7,168,364 B2 | 1/2007 | Schneider |
| 7,171,738 B2 | 2/2007 | Dick |
| 7,249,478 B2 | 7/2007 | Takehara |
| 7,367,761 B2 | 5/2008 | Kato |
| 7,437,210 B1 | 10/2008 | Shigefuji |
| 7,614,725 B2 | 11/2009 | Schulmeister |
| 8,505,175 B2 | 8/2013 | Lee et al. |

FOREIGN PATENT DOCUMENTS

| | | |
|---|---|---|
| EP | 1125682 A2 | 8/2001 |
| EP | 1219433 A1 | 7/2002 |
| EP | 1219439 A1 | 7/2002 |
| EP | 1219432 B1 | 4/2005 |
| JP | 06198357 | 7/1994 |
| WO | 9948694 | 9/1999 |

OTHER PUBLICATIONS

EBS Ink-Jet Systems product brochure for HANDJET EBS-250, 2005.
Messer, MG Systems & Welding, Inc., Brochure entitled "Ink Jet Marker, Fast, quiet marking with no damage to the plate surface", copyright 2006 Messer MG Systems & Wilding 12061M, Menomonee Falls, WI.
Website, http://www.mg-systems-welding.com/products.html, viewed Apr. 18, 2008.
Website, http://www.mg-systems-welding.com/marking.html, viewed Apr. 18, 2008.
Website, http://www.mg-systems-welding.com/inkjet.html, viewed Apr. 18, 2008.
Website, http://www.mg-systems-welding.com/tmc4500.html, viewed Apr. 18, 2008.
Website, http://www.mg-systems-welding.com/mpc2000.html, viewed Apr. 18, 2008.
Website, http://www.mg-systems-welding.com/titan.html, viewed Apr. 18, 2008.
Website, http://www.mg-systems-welding.com/metalmasterplus.html, viewed Apr. 18, 2008.
Website, http://www.midaprobing.com/product.sub.--en.htm, viewed Apr. 18, 2008.
Website, http://www.midaprobing.com/Transmission.sub.--sys.sub.--en.htm, viewed Apr. 18, 2008.
Website, http://www.midaprobing.com/news.sub.--en.htm, viewed Mar. 30, 2007.
PCT/US2008/061434, International Search Report and Written Opinion dated Jul. 3, 2008, 11 pages.
Rea-Jet, "Features of Performance," Dec. 2002 or earlier, 3 pages.
Dalemark Industries, Inc., "High Resolution Ink Jet Coding System," Nov. 25, 2002, 10 pages, and cover letter, 1 page.

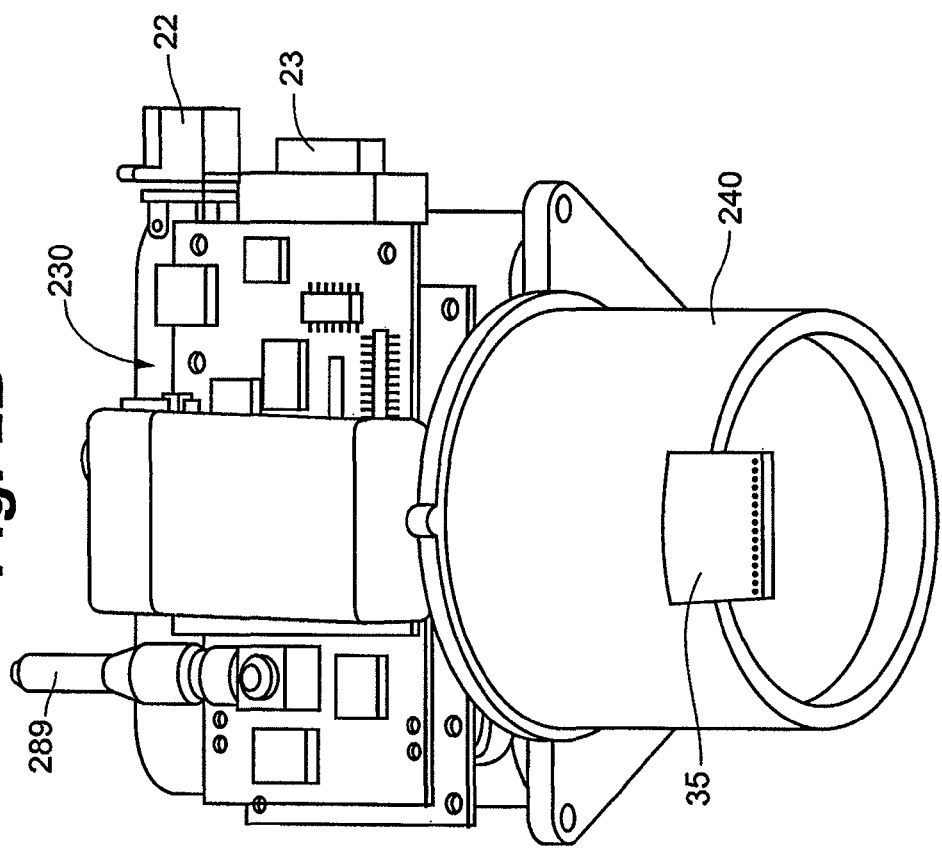
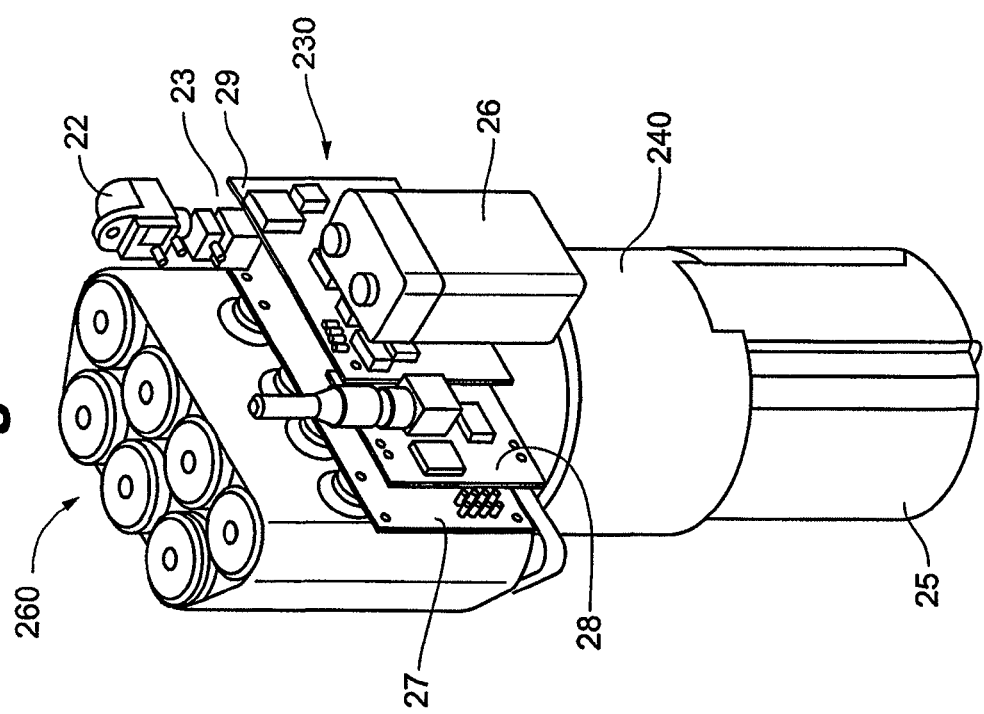

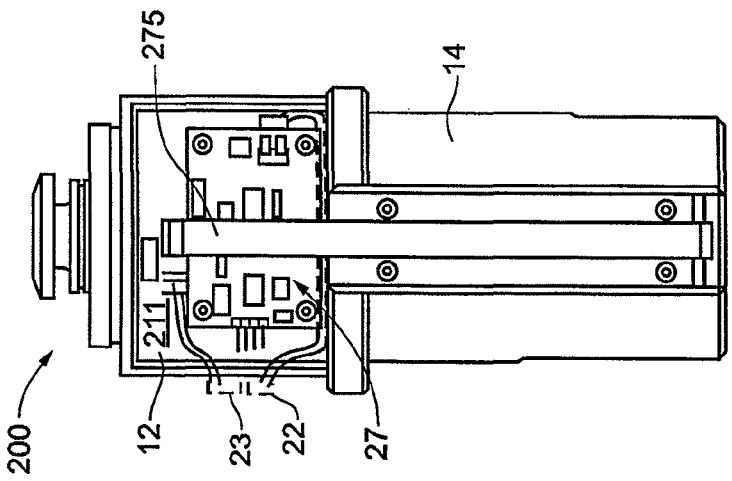
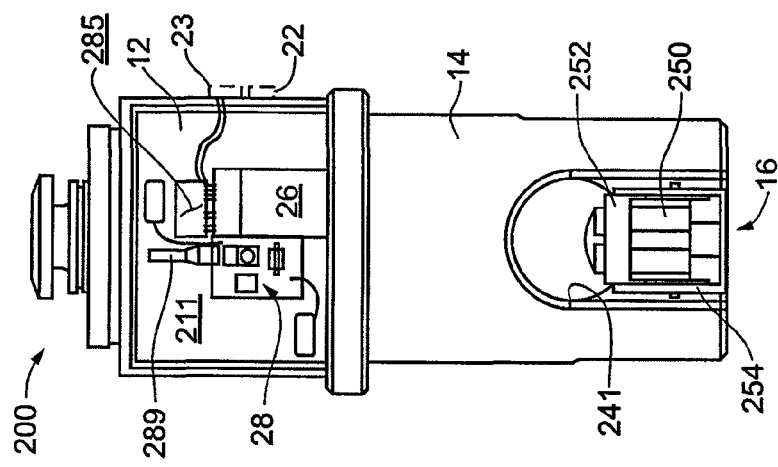
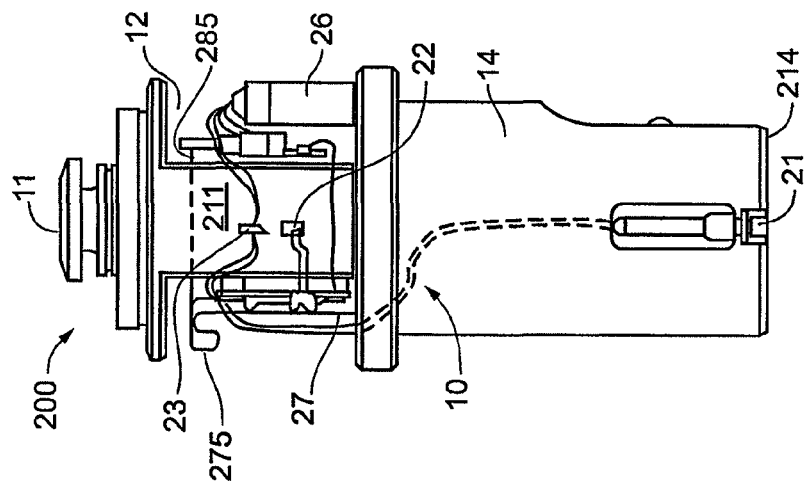

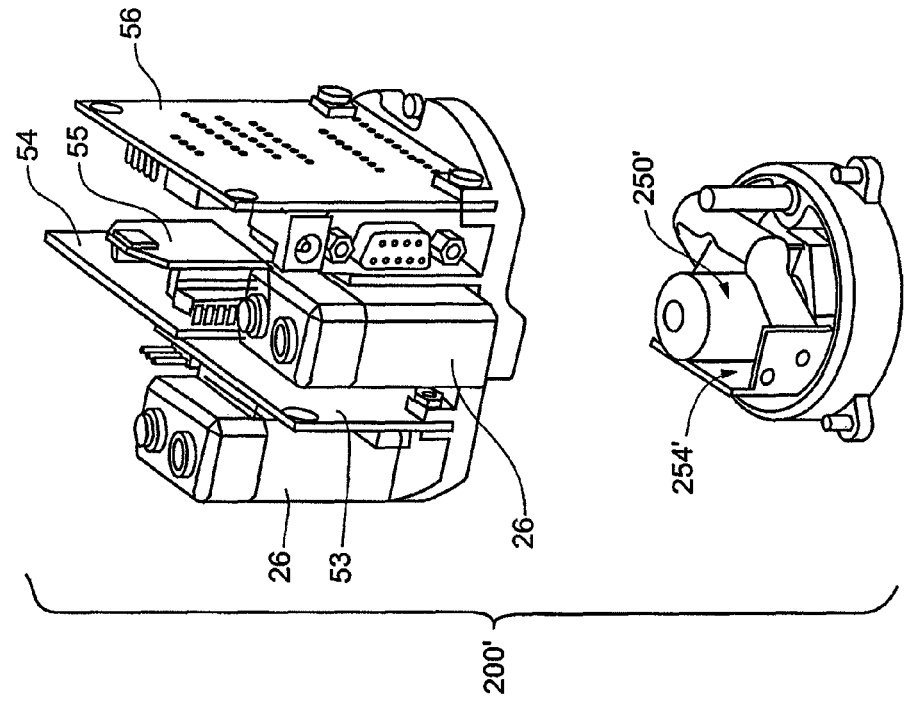
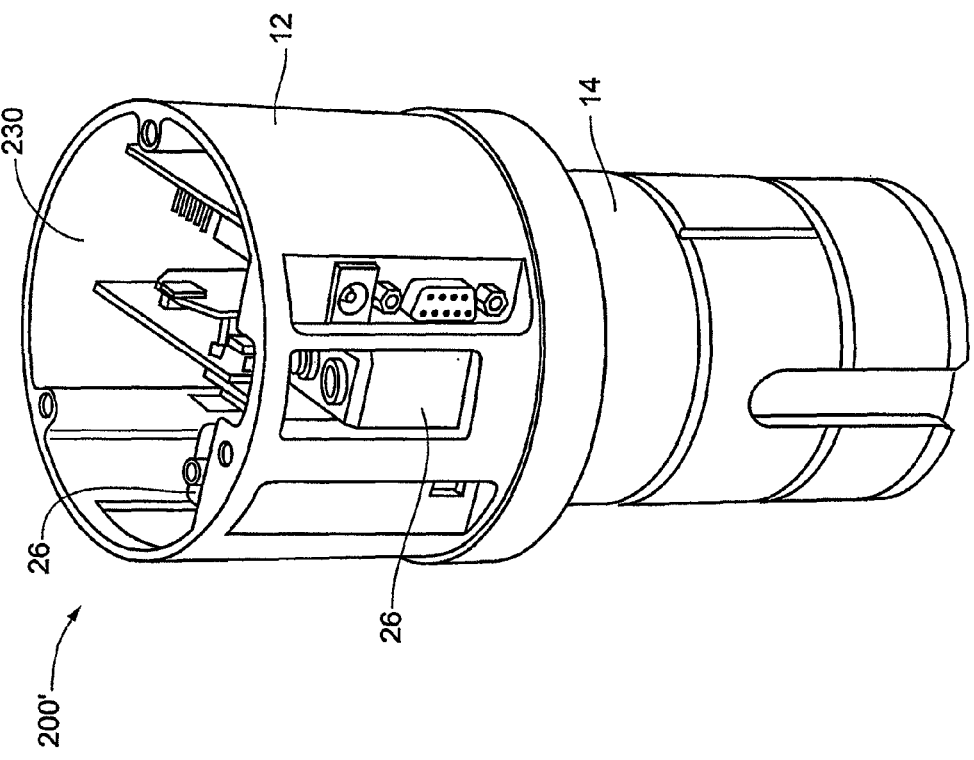

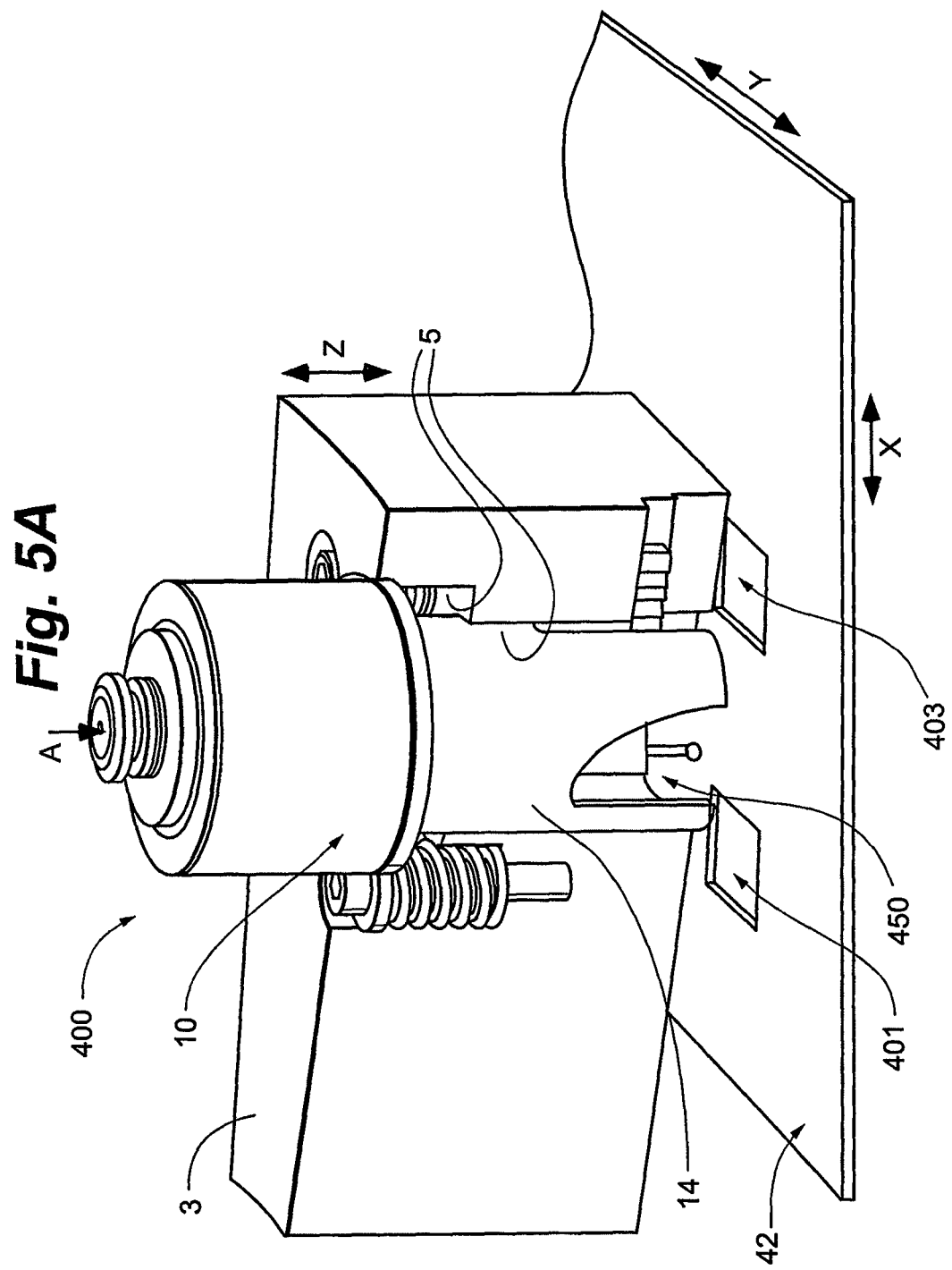

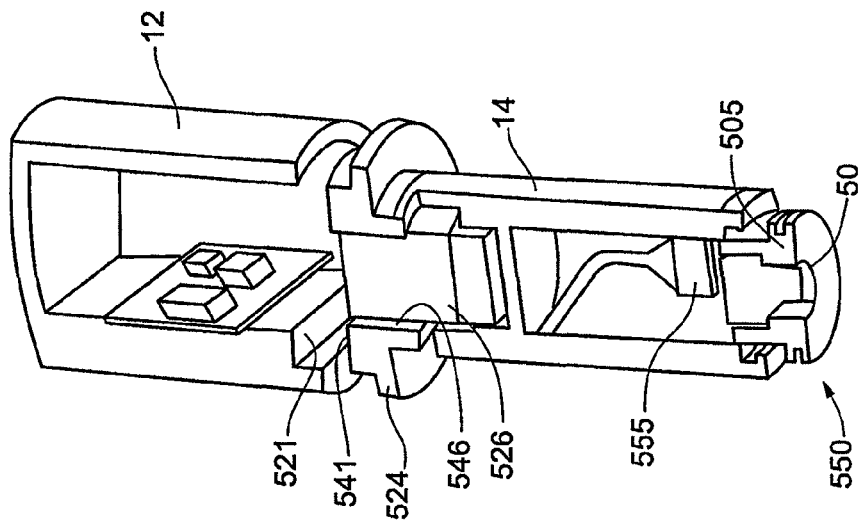
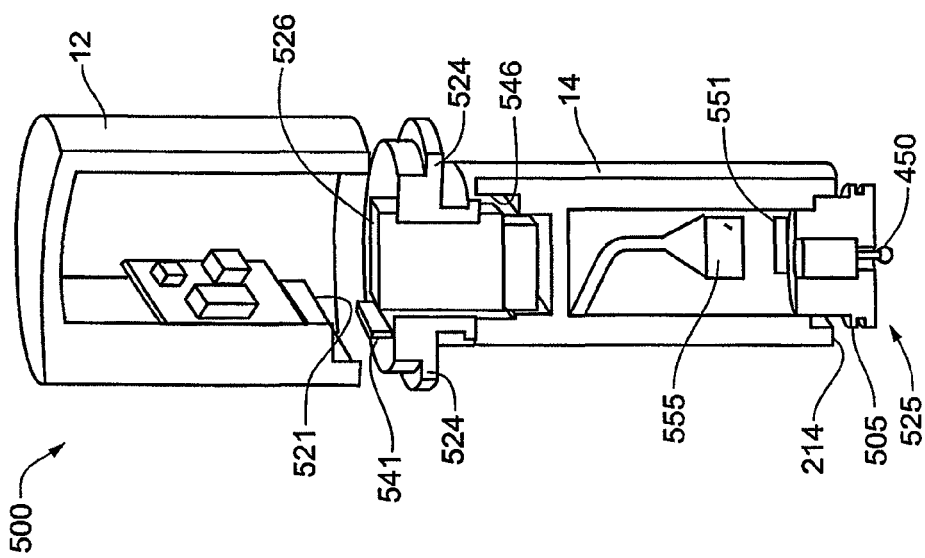

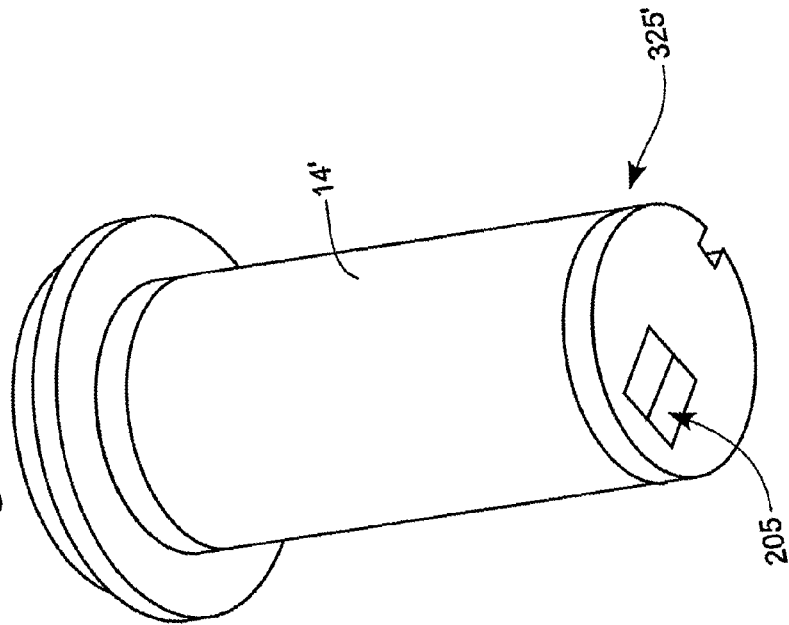
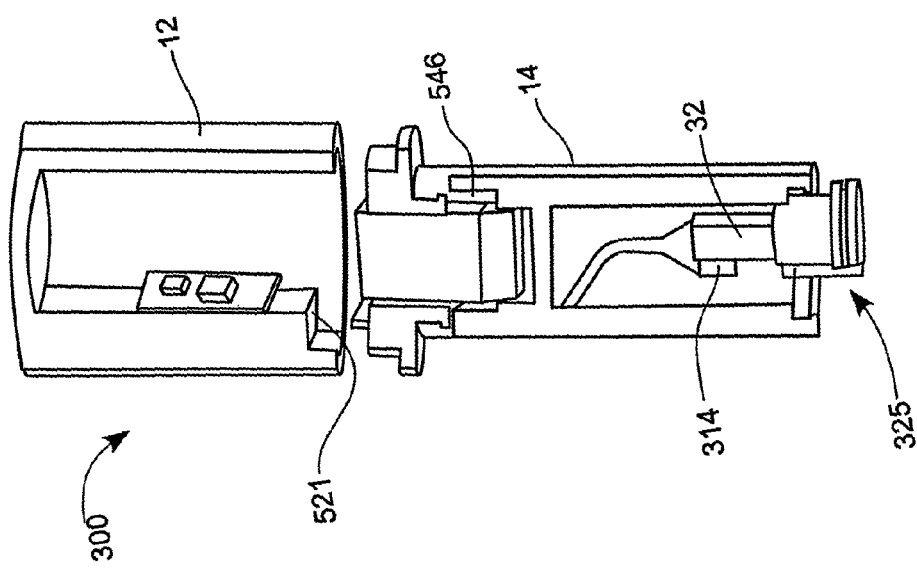

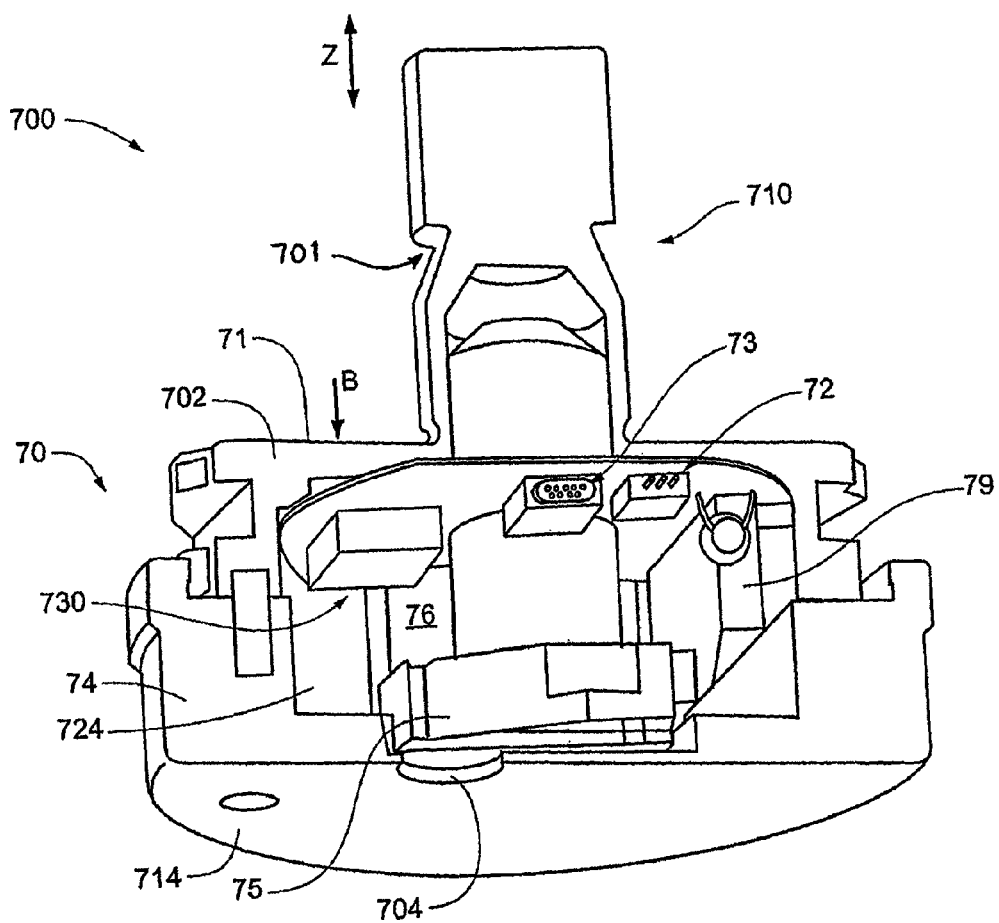

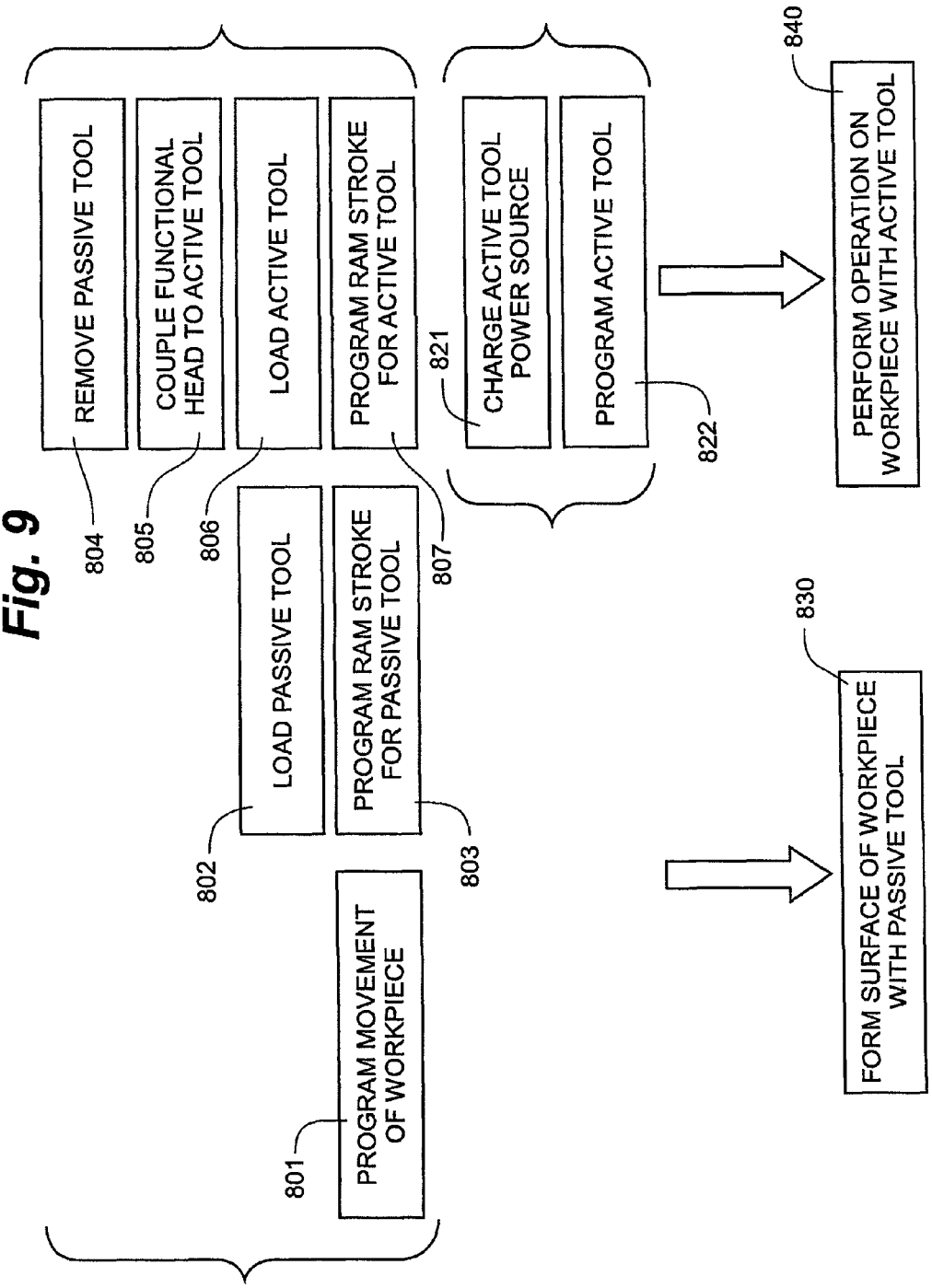

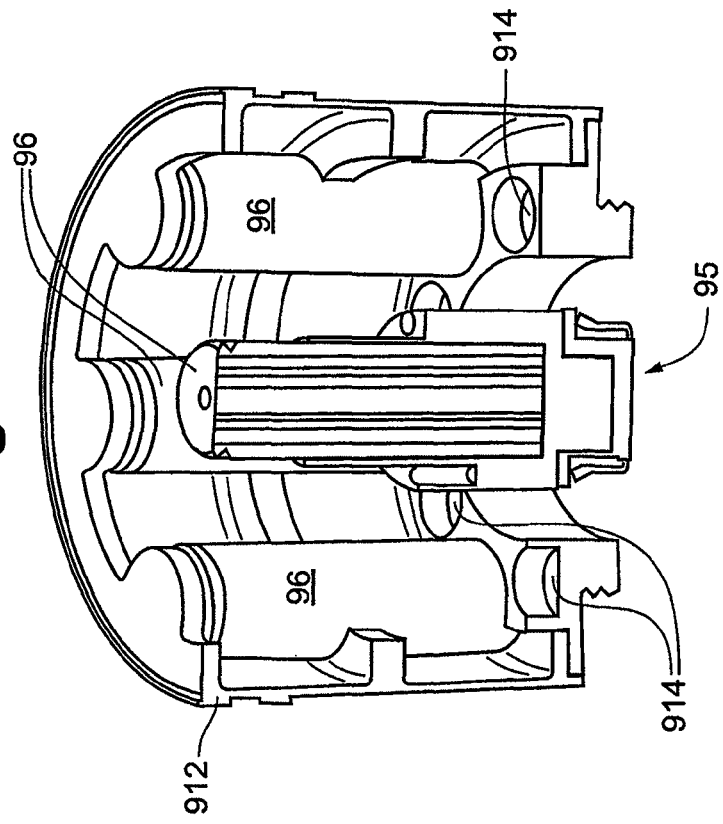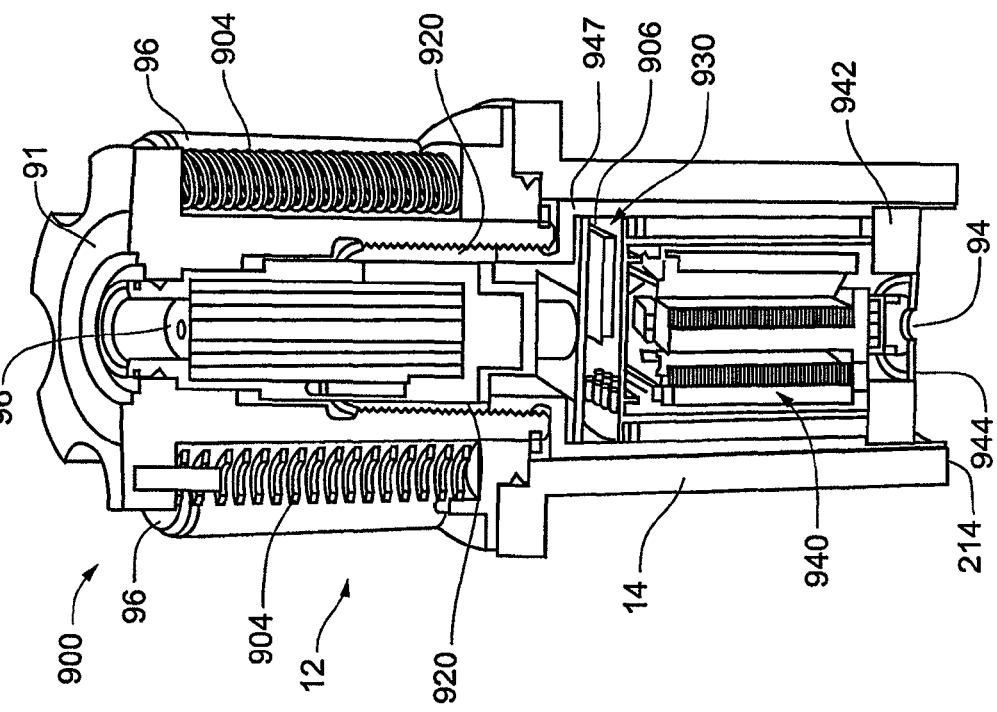

ASSEMBLIES AND METHODS FOR PROCESSING WORKPIECES IN RAM-DRIVEN PRESSES

RELATED APPLICATIONS

This application is a continuation of U.S. application Ser. No. 12/109,162, filed Apr. 24, 2008, which claims priority to U.S. Application Ser. No. 60/914,468, filed Apr. 27, 2007, the teachings of which are incorporated herein by reference.

TECHNICAL FIELD

The present invention pertains to assemblies and methods for processing work pieces and more particularly to assemblies and methods employed by ram-driven presses.

BACKGROUND

Ram-driven presses, for example, punch presses, are well known in the art. Punch presses are typically configured to hold a plurality of tools for forming a variety of shapes and sizes of indentations and/or holes in sheet workpieces, for example, sheet metal. Tools of this sort commonly include a punch and die; when a punch and corresponding die are mounted in a press and located in a working position of the press, beneath the ram (in some cases, coupled directly to the ram), the punch is driven, according to a pre-programmed ram stroke, to form an indentation or a hole through a sheet workpiece which has been located between the punch and die.

Product designs, which incorporate components formed from sheet workpieces, often require that a number of different types of holes be formed through each of the workpieces, so punch presses for processing these workpieces commonly employ a plurality of the tools mounted therein for each workpiece. In these cases, the press may be programmed to automatically move the appropriate tools, for a particular workpiece, into and out from the working position of the press, in sequence, for example, via rotation of a turret, in a turret-type press, or via manipulation of a multi-tool in a single station press, or by selection and replacement of tools, out from, and back into a tool magazine of a press, which may alternately be performed manually. Components formed from the sheet workpieces can often include, in addition to the aforementioned holes, one or more value-adding features, for example, an informational marking, that could be formed when each workpiece is still in sheet form, prior to the next stage of fabrication. Alternately, or additionally, the design specifications for these components can call for some kind of inspection of the sheet workpieces prior to the next stage of fabrication in order to characterize the workpieces and/or ensure a quality of the components formed therefrom. However, additional features and/or added inspection, if not handled in a most efficient manner, can significantly add to the cost of the components. Thus, there is a need for new assemblies and methods which can facilitate a streamlined and efficient approach to processing sheet workpieces.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIGS. 2A-B are perspective views of portions of the tool assembly shown in FIG. 1, according to some embodiments.

FIGS. 3A-C are various elevation views of portions of another active tool assembly, according to some embodiments of the present invention.

FIGS. 3G-H are perspective views of portions of an active tool assembly, according to an exemplary embodiment of the present invention.

FIG. 5A is a perspective view of an active tool assembly, according to some alternate embodiments of the present invention, assembled into the press.

FIGS. 6A-C are various exploded perspective views, including cut-away sections, of tool assemblies employing various functional heads, according to additional alternate embodiments of the present invention.

FIG. 6D is a perspective view of a configuration of a functional head which may be employed by alternate embodiments of the present invention.

FIG. 8 is a perspective view, including a cut-away section, of another tool assembly, according to yet further embodiments of the present invention, for mounting in an alternative type of ram-driven press.

FIG. 9 is a schematic outlining some methods of the present invention.

FIG. 10A is a perspective view, in cross-section, of a tool assembly, according to some of another category of embodiments of the present invention, which accommodate an active tool that can include various functional heads to perform any one of a number of forming operations.

FIG. 10B is a section view of a cover for the tool assembly of FIG. 10A, according to some embodiments.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. Constructions, materials, dimensions, and manufacturing processes suitable for making embodiments of the present are known to those of skill in the field of the invention. Those skilled in the art will recognize that many of the examples provided have suitable alternatives that can be utilized.

Figure 1:
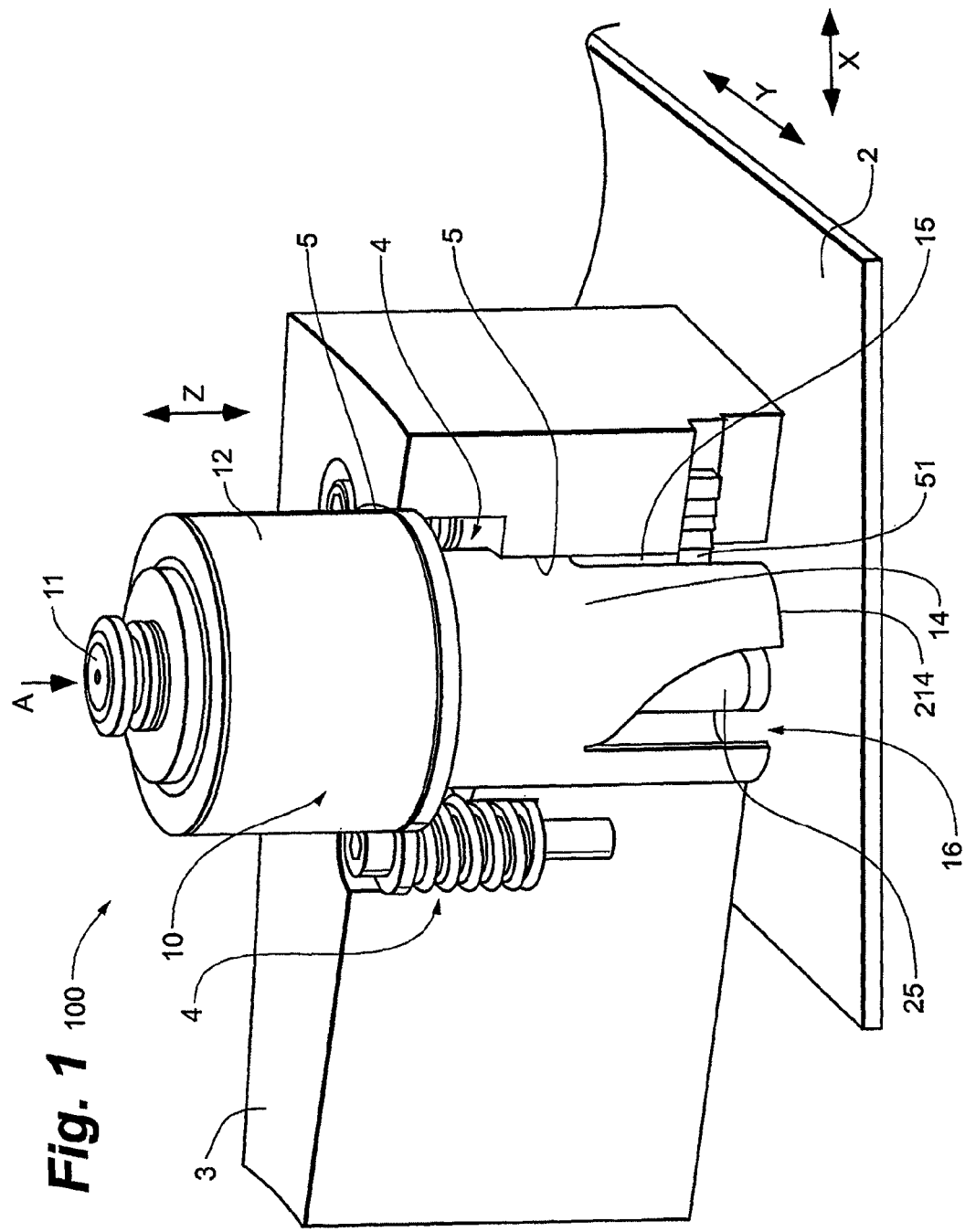
FIG. 1 is a perspective view of an active tool assembly, according to some embodiments of the present invention, assembled into a portion of a ram-driven press.

FIG. 1 is a perspective view of a tool assembly 100, according to some embodiments of the present invention, assembled into a portion of a press. FIG. 1 presents a segment of a mounting assembly, or upper turret 3, cut-away along a bore 5 thereof, in order to illustrate a mounting of tool assembly 100 therein for performing an operation on a sheet workpiece 2. FIG. 1 illustrates tool assembly 100 extending through bore 5 and resting on lifter springs 4 mounted within and about a periphery of bore 5. Those skilled in the art will understand that, although not shown in FIG. 1, an entirety of upper turret 3 includes a plurality of additional bores, either larger or smaller or similar in diameter to bore 5, which are arranged about a central axis of upper turret 3, and will further appreciate that the press, which includes upper turret 3, further includes, among other components, a table that supports workpiece 2 and moves workpiece 2 in an X- and Y-direction, a lower turret that resides below upper turret 3, and a ram or striker. Each of the additional bores, along with bore 5, of upper turret 3 typically accommodates a punch portion of a tool assembly, and the lower turret typically accommodates the corresponding die portion of the tool assembly, so that, when any of the bores are located beneath the striker of the press, the striker may drive the punch against a workpiece positioned between the punch and die to form an indentation or a hole therein.

According to embodiments of the present invention, tool assembly 100 of FIG. 1 includes, rather than a 'passive' forming tool, such as a punch, an 'active' tool; and, the 'active' tool of tool assembly 100 is contained by a housing 10 that makes tool assembly 100 interchangeable, within bore 5, with another tool assembly that includes a 'passive' tool. The term 'passive' is used herein to describe a tool that performs a function on a workpiece by passively responding to a ram stroke of the press, in which the tool is mounted; while the term 'active' is use to describe a tool, which is controlled by elements contained within the tool assembly itself, for example, by an integrated computer or microcontroller, to perform a function on the workpiece. It should be noted that, although a majority of embodiments of the present invention are described in the context of a turret-style punch press, the invention is not so limited, for alternate embodiments of the invention may be employed in any other style or type of ram-driven press, for example, including single station presses, such as the Durma, RP6 or RP9, punching machine, and the Privatec platen machine, which are known to those skilled in the art.

FIG. 1 further illustrates assembly 100 including a striking surface 11, to receive a ram-stroke A of the press, in a Z-direction, and housing 10 including a first portion 12, resting on lifter springs 4, and a second portion 14, extending from first portion 12 through bore 5; those skilled in the art will appreciate that tool assembly 100 has been 'dropped', or loaded into bore 5, having been oriented therein by a key 51 of upper turret 3 interfacing with a mating slot 15 formed in second portion 14 of housing 10. Although housing 10 is shown having a cylindrical form in FIG. 1, it should be noted that the invention is not so limited, and any suitable geometry for housing 10 may be employed for embodiments of the present invention. FIG. 1 further illustrates, via a cut-away portion of housing second portion 14, a functional head 25 of the active tool, which is contained within second portion 14, and oriented to perform a function on workpiece 2 through an opening 16 formed in a bottom surface 214 of second portion 14. According to the illustrated embodiment, functional head 25 is powered by a power source and controlled by a microprocessor, or microcontroller, which are both also contained by housing 10, for example, being located within upper portion 12 thereof; assembly 100 may further include a switch (not shown) for activating functional head 25, which switch is preferably mounted on housing 10 such that a movement of housing 10, in the Z-direction, in response to ram-stroke A, triggers the switch. Exemplary switches will be described below, in conjunction with FIGS. 3A-C.

According to some embodiments of the present invention, the function performed by functional head 25 on workpiece 2 does not require that physical contact be made between head 25 and workpiece 2, and head 25 may be fixed at a recessed position within opening 16 of housing second portion 14; however, according to some alternate embodiments, the function performed does require some physical contact between head 25 and workpiece 2. In either case, according to a first category of embodiments of the present invention, contact between assembly 100 and workpiece 2, which can cause plastic deformation of workpiece 2 in the Z-direction, particularly deformation through an entire thickness thereof, is prevented. Thus, according to some methods of the present invention, a pre-programmed travel of ram-stroke A, corresponding to assembly 100, is such that functional head 25 of the active tool of assembly 100 is positioned at an appropriate position with respect to workpiece 2 to carry out the intended function, and a depth, or maximum travel toward workpiece 2, of ram-stroke A is such that assembly 100 does not plastically deform workpiece 2. In contrast, a pre-programmed travel of another ram-stroke of the same press, which is applied to a passive tool assembly mounted or loaded within the press, for example, in another bore of upper turret 3, necessarily causes the forming tool of that assembly, for example, a punch acting in concert with the associated die, to plastically deform workpiece 2 through a thickness thereof. Examples of some functions, not leading plastic deformation of workpiece 2, and which functional head 25 may perform on workpiece 2, include, without limitation, marking and information collection. For the purpose of marking, functional head 25 may be a printer head or cartridge, or an etching head or a laser; and, for the purpose of information collection, functional head may be a bar code reader, a camera, a touch probe, or a laser.

A second category of embodiments of the present invention, which will be described in greater deal below, in conjunction with FIGS. 9A-12B, includes active tool functional heads to perform other types of operations, which, although these operations result in plastic deformation of the workpiece, are distinct from a ram-driven forming operation such as punching or stamping. Examples of forming operations performed by these types of functional heads include, without limitation, cutting, such as milling and drilling, and bending. Those skilled in the art will appreciate that any of the aforementioned functions performed on workpiece 2, in the same press where one type of forming of workpiece 2, for example via punching, is performed, can save time and money in the fabrication of components from workpiece 2.

FIGS. 2A-B are perspective views of portions of tool assembly 100, according to some embodiments. With coverings of first and second portions 12, 14 removed, FIG. 2A illustrates electronics 230, in the form of a single board computer (SBC), contained in first portion 12 and including various modules, for example, arranged according to the PC/104 form factor or the PC/104+ form factor, and including a mother board 27, a control module 29 and an optional communications module 28. According to the illustrated embodiment, electronics 230 include the aforementioned microprocessor, or microcontroller, for example, employing RISC architecture such as X-scale ARM, along with a memory, for example, ROM, such as PROM, EPROM, or EEPROM, an optional data storage, for example, RAM, Flash Memory, DRAM, eDRAM, SRAM, 1T-SRAM, Z-RAM, etc. . . . , and an optional antenna 289 for wireless reception of radiofrequency (RF) transmissions of, for example, programming instructions for controlling functional head 25. Some examples of wireless transmission which may be employed include, without limitation, WiFi 802.11x (IEEE), Zigbee 802.15.4, Bluetooth 802.15.1 (or ISO 18000 for RFID). According to some embodiments, wherein functional head performs an inspection function on workpiece 2, the communications module further functions to transmit information collected by head 25, for example, inspection data, either in real time from head 25, or from the storage, to a data processing system, which may be independent of the press, or integrated into the press, and which analyzes the collected information and may generate charts or graphs summarizing the information for an operator of the press, or provide information for feedback control of the operation of the press. It should be noted that the electronics modules of embodiments of the present invention may be arranged according to any appropriate form factor known to those skilled in the art or one specialized, or tailored, to a particular tool assembly configuration. For example, although embodiments including multiple boards are illustrated herein, a single board may be configured to include all the required electronic components mounted thereon.

FIG. 2A further illustrates an adapter 240 coupling functional head 25 to the power source and electronics 230; and FIG. 2B illustrates the portion of tool assembly 100 with functional head 25 removed so that a connector 35 of adapter 240 may be seen. According to the illustrated embodiment, connector 35 accommodates reversible coupling of functional head 25 to the power source and electronics 230. With reference back to FIG. 1, it should be appreciated that, according to some embodiments, functional head 25 may be unplugged from connector 35 and removed from assembly 100 through opening 16 of housing second portion 14 for disposal or repair, and in order to install a replacement head or a different type of functional head into the active tool of assembly 100.

FIG. 2A further illustrates the aforementioned power source for the active tool including a set of batteries 260, for example, supplying anywhere from approximately 3 volts to approximately 24 volts, or higher, for the function of functional head 25 and another battery 26, for example, supplying approximately 9 volts to power electronics 230. It should be noted that a required capacity of the power source varies according to the function of functional head 25; for example, some embodiments presented below may only require a 9 volt battery. According to preferred embodiments of the present invention, the power source is rechargeable, and the communications module may be further adapted to receive RF transmissions of energy for recharging the power source.

Figure 2C:
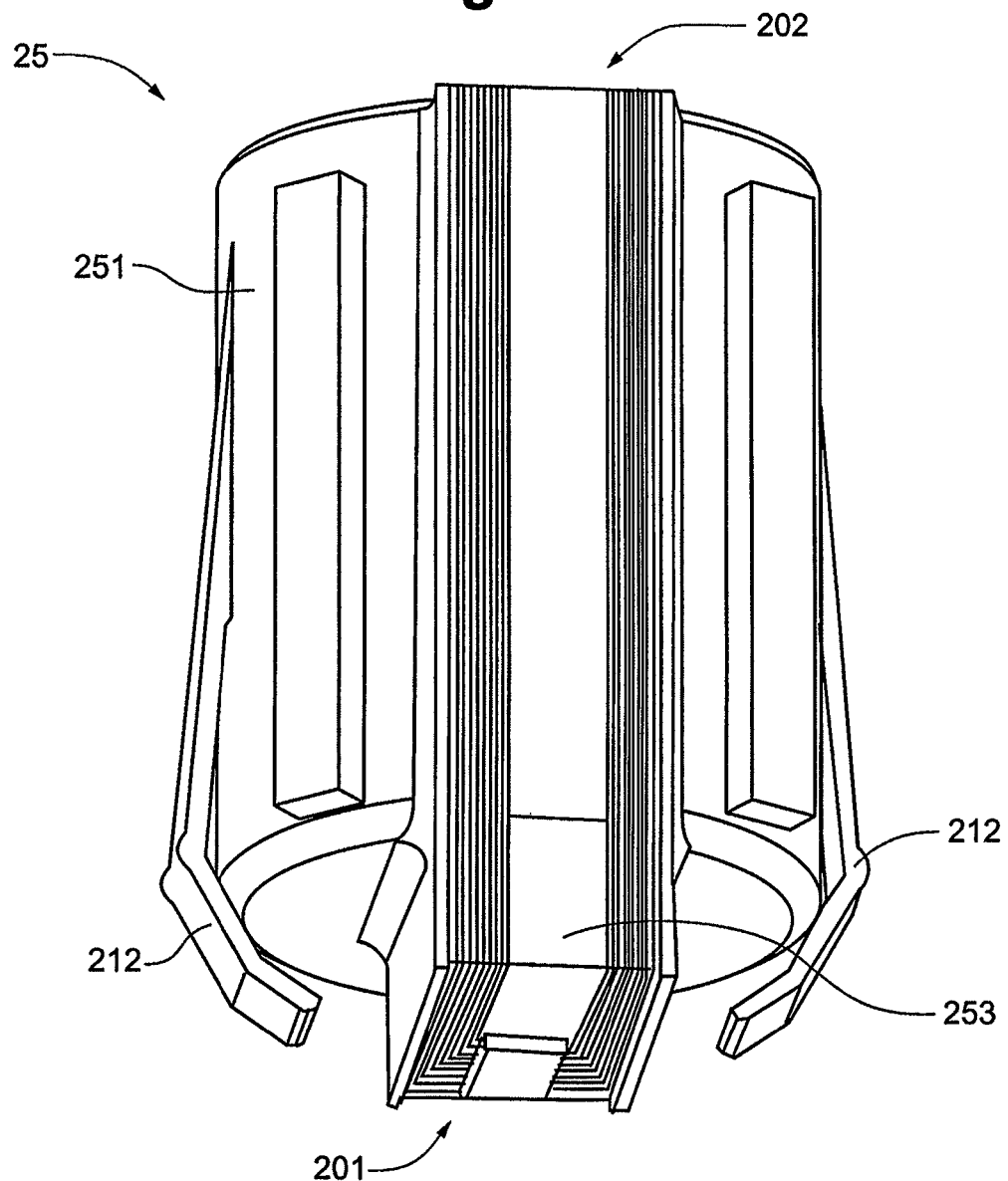
FIG. 2C is a perspective view of a particular embodiment of a functional head for the tool assembly shown in FIGS. 1 and 2A-B.

FIG. 2C is a perspective view of functional head 25 formed as a printer cartridge 251 carrying a print block 253, which extends from a printing end 201 to a coupling end 202 for joining with connector 35 (FIG. 2B). According to the illustrated embodiment, functional head 25 further includes a pair of opposing spring members 212 which may be pressed toward one another to insert cartridge 251, coupling end 202 first, into opening 16 of housing second portion 14 (FIG. 1); once cartridge 251 is inserted and coupled to connector 35, members 212 extend outward away from one another to further secure cartridge 251 within housing second portion 14. When cartridge 251 is fully inserted and coupled, printing end 201 may either be recessed within opening 16 or extend from opening 16.

Figure 2D:
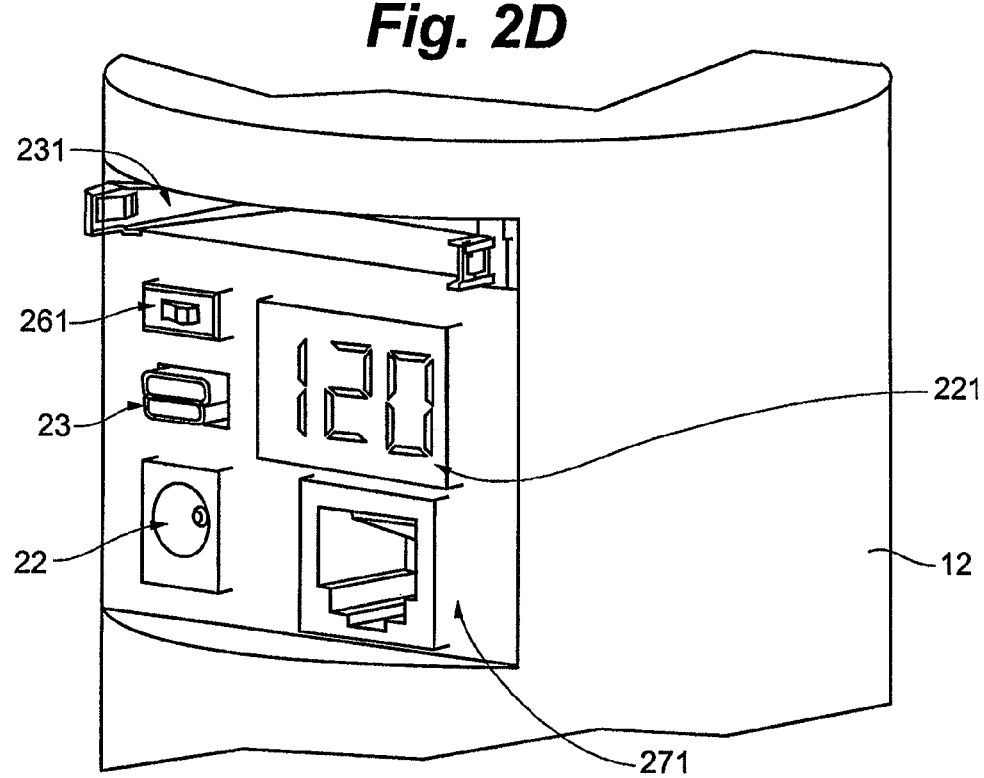
FIG. 2D is a detailed view of optional connectors for the assembly shown in FIG. 1.

Referring back to FIGS. 2A-B, the active tool is shown to include optional connectors 22 and 23; connector 22, for example, a RoHS compliant 2.5 mm panel mount power jack with mounting ears from CUI Inc., provides a reversible connection, for a lead wire to charge batteries 260 and/or battery 26, and connector 23, for example, USB (type A2.0), provides a reversible connection for another lead wire to transmit programming instructions and/or data to electronics 230 and/or to transmit information/data from functional head 25 and/or from the data storage of the active tool. According to some embodiments, a programmer and/or information source is also mounted in the press, for example, being contained in a housing similar to housing 10 (FIG. 1) and mounted in a turret bore adjacent to the bore in which the active tool is mounted. According to those embodiments, which include wireless communications module 28 and connectors 22, 23, connectors 22, 23 provide a backup to communications module 28, while, according to other embodiments that do not include wireless communications module 28, connectors 22, 23 are the sole provider for data transmission and/or energy transmission. FIG. 2D is a detailed view of various of optional connectors which may be mounted on housing first portion 12, in addition to connectors 22, 23. FIG. 2D illustrates a power switch 261 located above connector 23, a secure digital (SD) or compact flash (CF) slot (for removable data or programming storage, for example, via Type I and Type II cards) 231 located above switch 261, an LCD or LED display 221 located alongside switch 261 and connector 23, and an Ethernet networking connection 271 located below display 221.

Figure 3D:
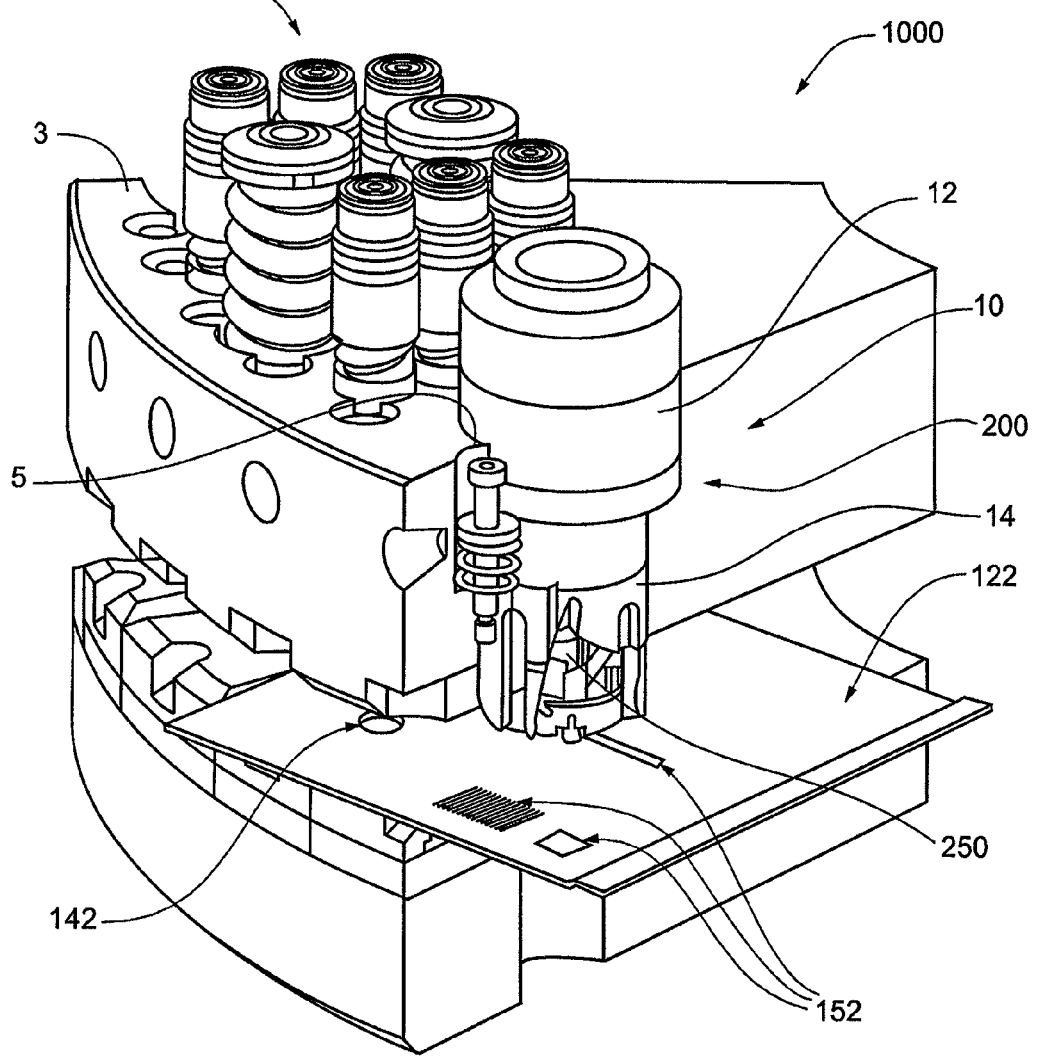
FIG. 3D is a perspective view of a portion of a ram driven press, in which the tool assembly of FIGS. 3A-C is mounted.

FIGS. 3A-C are various elevation views of a portion of an active tool assembly 200, which incorporates an active tool including a printer cartridge 250 as the functional head, according to some embodiments of the present invention; and FIG. 3D is a perspective view of a portion of a ram driven press 1000 in which assembly 200 is mounted along with a plurality of other tool assemblies 103, which may include either active or passive tools. Like assembly 100, of FIG. 1, assembly 200 includes housing 10 to contain the active tool thereof, and to make assembly 200 interchangeable with a passive tool assembly in ram-driven press 1000, for example, in turret bore 5 of turret 3. FIG. 3D illustrates a workpiece 122 being mounted for processing in press 1000 and including a punched feature 142, for example, formed by one of tool assemblies 103, which includes a passive punch tool, and printed features 152, formed by printer cartridge 250 of active tool assembly 200.

FIGS. 3A-C illustrate housing second portion 14 of housing 10 containing printer cartridge 250, which is mounted in a holder 254 that is attached within second portion 14, and a switch 21, which is mounted to housing second portion 14, in proximity to bottom surface 214 thereof. With a covering of first portion 12 of housing 10 removed, FIGS. 3A-C further illustrate battery 26 and electronic components of the active tool contained therein; the electronic components are similar to electronics 230 described in conjunction with FIG. 2A, but are arranged in a different fashion around a central wall 211, which extends below striking surface 11 and divides housing first portion 12 into two compartments. Printer cartridge 250 is shown coupled, via a ribbon wire 275, to mother board 27, which includes a microprocessor or controller for cartridge 250. Although an exemplary routing of lead wires is shown for the electrical coupling between the various elements of the active tool of assembly 200, it should be appreciated that any suitable wire routing may be employed.

According to the illustrated embodiment, switch 21 is mechanically triggered to activate printer cartridge 250 of assembly 200 by touching off workpiece 122, when bottom surface 214 comes into proximity with workpiece 122. Thus a pre-programmed ram-stroke for tool assembly 200 has a maximum travel, on the down-stroke, or toward workpiece 122, that is necessary to bring switch 21 into contact with workpiece 122. A subsequent up-stroke of the pre-programmed ram-stroke allows housing 10 to move away from workpiece 122 until there is a gap, between housing 10 and workpiece 122, that results in an appropriate focal length for printer cartridge 250; a pre-programmed delay between the triggering of switch 21 and a start of printing can account for the time it takes for the up-stroke, or for workpiece travel. According to some embodiments, cartridge 250 is recessed within opening 16 of housing second portion 14 at a distance corresponding to the focal length, so that the ram-stroke need not include the up-stroke to create the gap. According to preferred embodiments, a pre-programmed travel of the table supporting the workpiece 122, moves workpiece 122 under cartridge 250 during the printing process, so that a position of cartridge 250 may remain fixed.

Other types of switches, which may be employed by embodiments of the present invention to activate printer cartridge 250, or functional head 25 (FIGS. 1, 2A-B), or any of the other embodiments of functional heads described herein, include, without limitation, any type of proximity switch and switches including an accelerometer. For example, a proximity switch including a reflective optical sensor may be triggered when a functional head of an active tool assembly, for example, cartridge 250, comes into a predetermined proximity with a workpiece, or a switch including an accelerometer may be triggered by a deceleration of the movement of housing 10. The pre-determined proximity or deceleration may each correspond to a pre-programmed depth of the ram-stroke for a particular function head of an active tool assembly. According to alternate embodiments of the invention, printer cartridge 250, or the functional head of any of the other active tools described herein, may be activated by a signal sent from a control center of the press, which control center also controls the ram stroke and the travel of the table supporting the workpiece; the signal may be sent wirelessly from the control center to be received by wireless communications module 28 of the active tool.

Figure 3E:
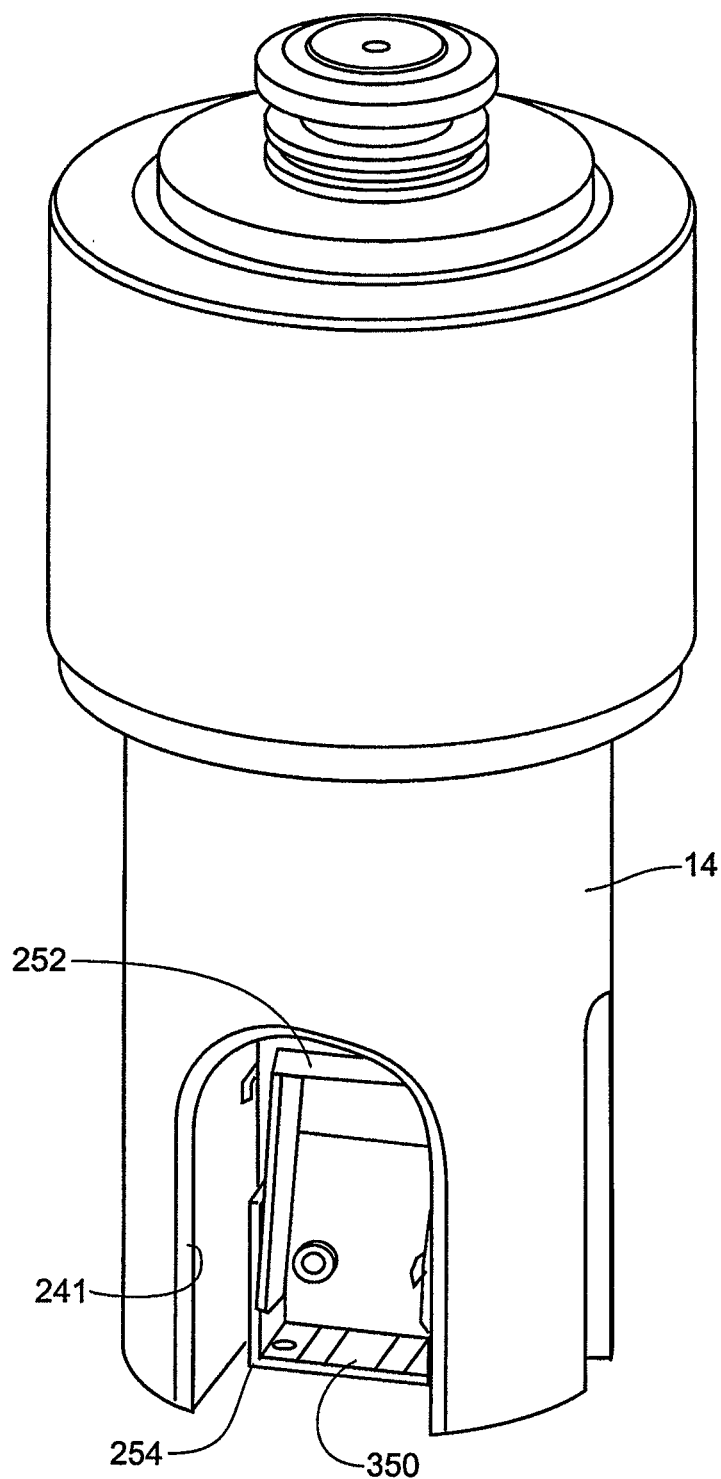
FIG. 3E is a perspective view of the tool assembly shown in FIGS. 3A-C.

With reference now to FIG. 3E, which is a perspective view of tool assembly 200 having printer cartridge 250 removed, it may be appreciated that an aperture 241 formed in a sidewall of housing second portion 14 provides access for replacement of cartridge 250. Cartridge 250 may be removed, for example, by lifting a lever 252 of cartridge holder 254 and de-coupling, or un-plugging, cartridge 250 from a connector 350 coupled to ribbon wire 275, so that another printer cartridge may be plugged into connector 350. According to an alternate embodiment, aperture 241 in housing second portion 14 may not be required. For example, with reference to FIG. 2B, alternate embodiments of printer cartridges may be reversibly coupled, that is, coupled to and de-coupled from the active tool, at connector 35, which is located more in proximity to an upper end of housing second portion 14, and is oriented to accommodate insertion and withdrawal of printer cartridges, in through, and out from opening 16 of housing second portion 14 (FIG. 1).

Figure 3F:
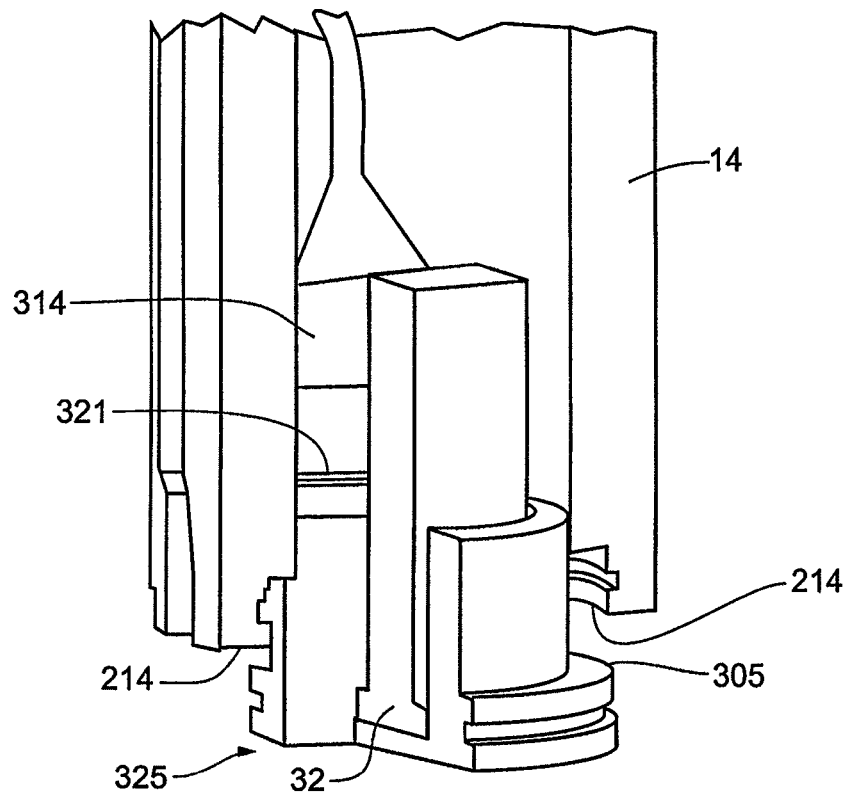
FIG. 3F is an exploded perspective view, including cut-away sections, of a portion of a tool assembly, according to another embodiment.

FIG. 3F is an exploded perspective view, including a cut-away section, of a portion of a tool assembly 300, according to another embodiment. FIG. 3F illustrates another configuration of an active tool for marking a workpiece, wherein a functional head assembly 325 includes a printer cartridge or print head 32 mounted in a mounting fixture 305 for coupling with bottom surface 214 of housing second portion 14. Mounting fixture 305 may be formed from a relatively soft, yet durable material, for example a plastic or silicone rubber so as not to scratch or otherwise deform workpiece 2, if fixture 305 should come into contact with workpiece 2 during the processing thereof, for example, during printing. FIG. 3F further illustrates an adapter 314 extending into second portion 14 for reversible coupling with a connector 321 of printer assembly 325; it should be understood that adapter 314 is electrically coupled to electronics contained in housing first portion 12 and a power source contained within either first portion 12 or second portion 14. According to the embodiment illustrated in FIG. 3F, assembly 325 may be separated from lower housing second portion 14 in order to replace print head 32, such that aperture 241, shown in FIG. 3E, is not required. Additional portions of a particular embodiment of assembly 300 are shown in FIG. 6C and will be described, below, in conjunction with FIGS. 6A-C.

Examples of suitable printer cartridges, or print heads, which may be employed by embodiments of the present invention, include, without limitation, types available from Hewlett Packard, Spectra, Inc., FUJIFILM Dimatix, RSI, Zanasi USA, or Matthews International. Suitable industrial marking inks may be pigmented or dye type and are available, for example, from Carco Incorporated and Matthews International.

FIGS. 3G-H are perspective views of portions of an active tool assembly 200' including a printer cartridge 250', according to an exemplary embodiment of the present invention. FIG. 3H illustrates printer cartridge 250' mounted in a holder 254', for example, a HP 5160A Black Inkjet cartridge in an HP Q7543A Inkjet Cartridge holder, both available from Hewlett Packard; the holder 254' and cartridge 250' are contained in housing second portion 14, shown in FIG. 3G. FIGS. 3G-H further illustrate an arrangement of electronics 230 and two nine volt batteries 26, which are contained within housing first portion 12. With reference to FIG. 3H electronics 230 includes: a serial inkjet board 53, for example, model no. 27948 available from Parallax Inc. (Rocklin, Calif.); a board 54 carrying a wireless module with "On Chip" antenna 55, for example, an AppBee-Mod(5-12V), available from SelmaWare (Carbondale, Ill.), carrying an XBee Transceiver, available from Digi (Minnetonka, Minn.); and a carrier board 56 to which a microprocessor is mounted, for example, a BSCB-2 carrier board, available from BiPOM Electronics (Missouri City, Tex.), carrying a Basic Stamp BS2e microprocessor available from Parallax (Rocklin, Calif.). Although not shown in FIGS. 3G-H, it should be appreciated that wiring, for example, ribbon wire 275, as previously described in conjunction with FIG. 3C, couples printer cartridge to electronics 230, for example, via a connector in holder 254'. The connector, like connector 350 of holder 254, may reversibly couple with cartridge 250', so that, for example, when cartridge 250' runs out of ink, it may be disconnected, or de-coupled, for replacement with a fresh cartridge. Also, with reference back to FIG. 3A, switch 21 may be integrated into active tool assembly 200' in a similar fashion to that previously described for tool assembly 200, or any of the other types of switches previously described may be employed by assembly 200'.

Figure 4A:
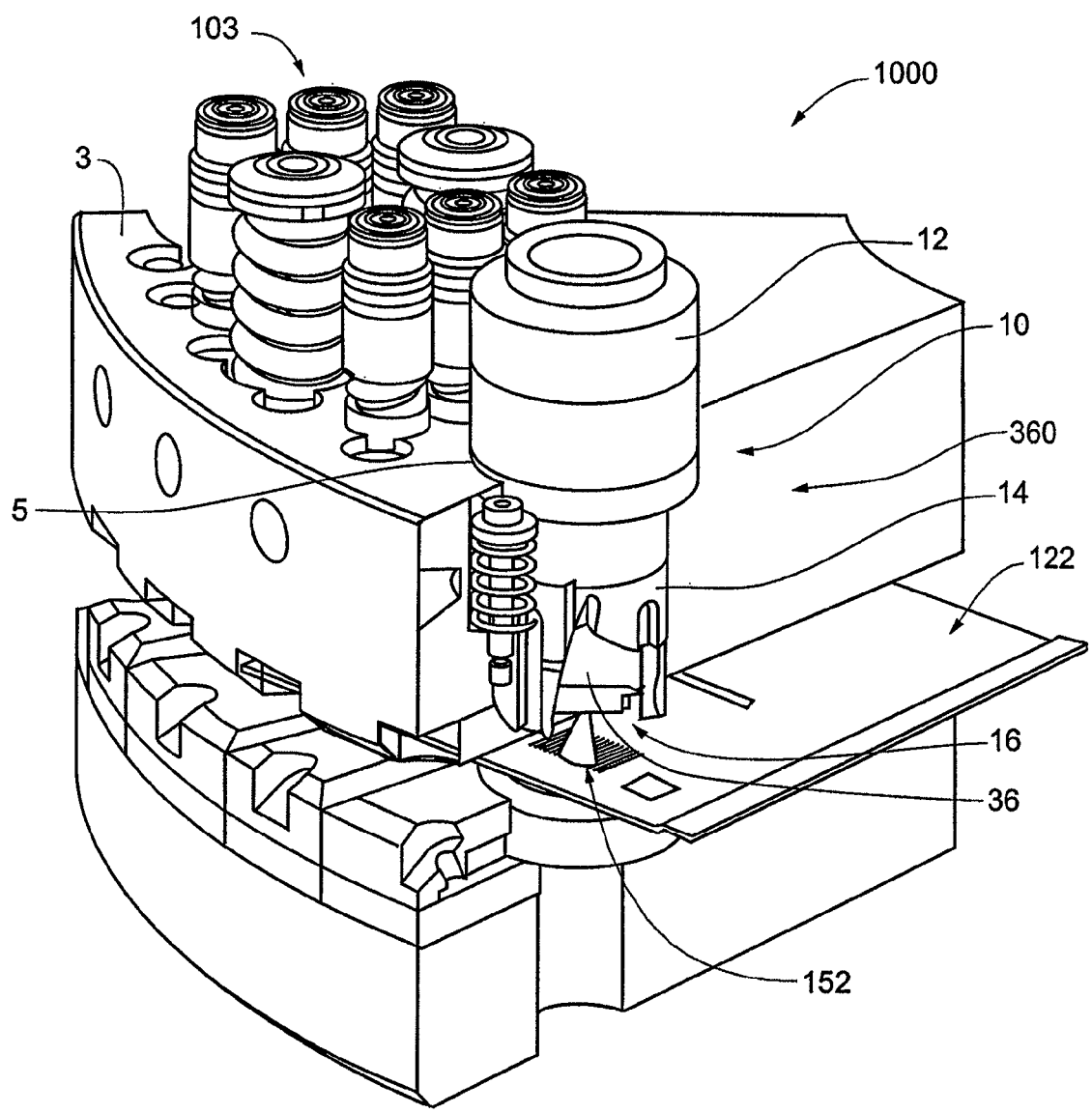
FIGS. 4A-B are perspective views of a portion of the ram driven press in which alternative embodiments of active tool assemblies are mounted.
Figure 4B:
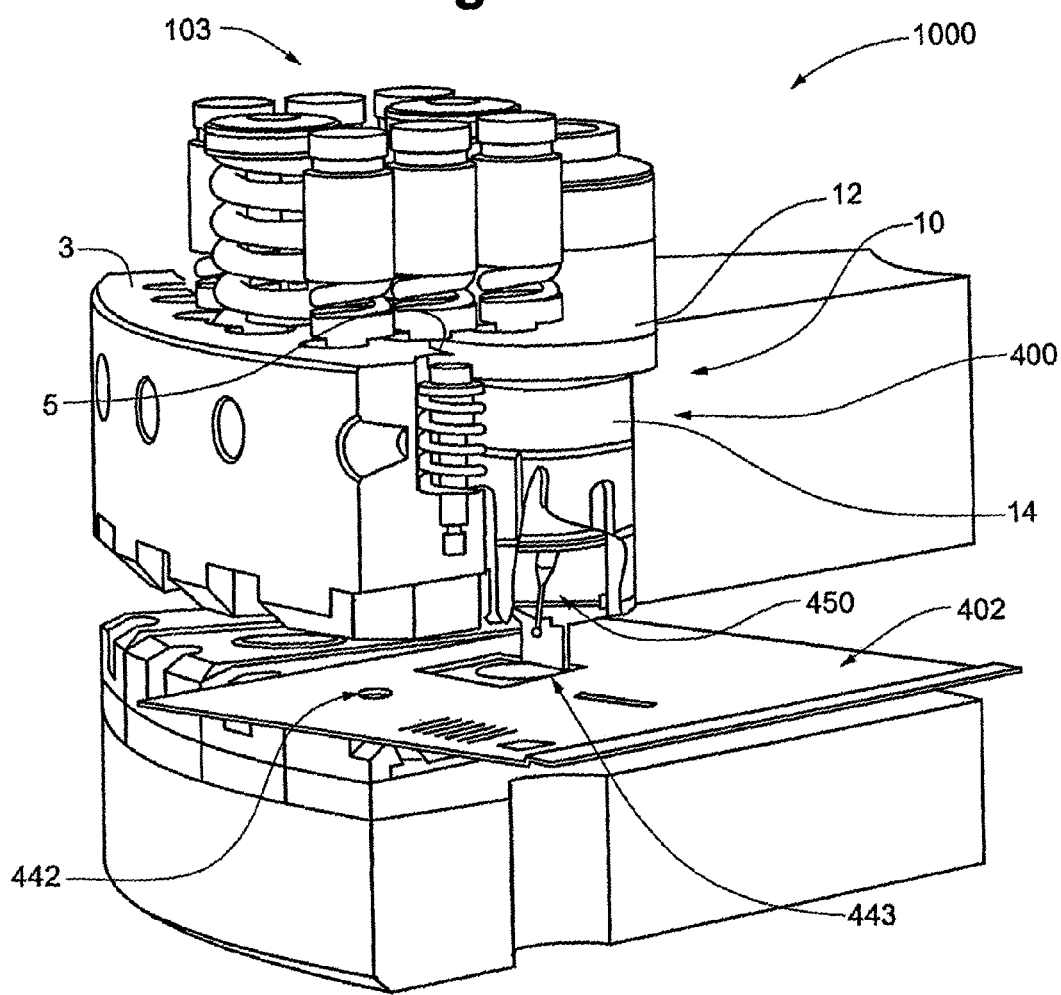

As previously mentioned, according to other embodiments of the present invention, an active tool assembly includes a functional head to collect information from a workpiece. FIGS. 4A-B are perspective views of a portion of ram driven press 1000, in which active tool assemblies 360 and 400, respectively, are shown including a function head for collecting information from workpieces 122 and 422, respectively.

FIG. 4A illustrates tool assembly 360 mounted in bore 5 of upper turret 3 of press 1000, and including a bar code reader 36, which is seen through a cut-way wall segment of second portion 14 of housing 10. Reader 36 may be coupled to a power source and electronic components, which are packaged in first portion 12 of housing 10, for example, as illustrated either in FIGS. 2A-B or in FIGS. 3A-C; and reader 36 may include a mating connector for reversible connection with connector 35 of FIG. 2B or with adapter 314 of FIG. 3F. According to the illustrated embodiment, bar code reader 36 is oriented within housing second portion 14 to scan the bar code of printed features 152 on workpiece 122, through opening 16 in second portion 14 of housing 10, and the information encoded in the bar code and collected by the scan is stored in a memory or data storage element of the electronics housed in first portion 12, and/or transmitted, via wired or wireless communications, as previously described, to a control center of press 1000 and/or to a remote data base. An exemplary bar code reader that may be employed by embodiments of the present invention is a DataMan™ image-based ID reader, available from Cognex Corporation (Natick, Mass.); DataMan™ 100 ID readers include lighting, camera, processor and communications all integrated into a relatively small industrial housing that can be mounted in housing second potion 14.

FIG. 4B illustrates tool assembly 400 mounted in bore 5 of upper turret 3 of press 1000, and including a touch probe 450, which is seen through a cut-away wall segment of second portion 14 of housing 10. Touch probe 450 is oriented within housing second portion 14 to collect information in the form of inspection data from a workpiece 402, via interaction with formed features 442 and 443, in a manner similar to methods described in greater detail, for a workpiece 42, in conjunction with FIGS. 5A-C. According to the illustrated embodiment, each of features 442 and 443 may have been formed in workpiece 402 by another tool assembly of the plurality of tool assemblies 103 shown mounted in turret 3.

Figure 5B:
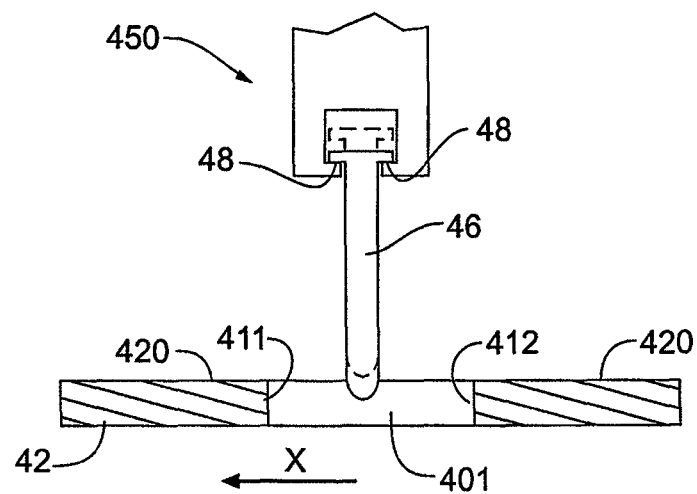
FIGS. 5B-C are schematics of alternate embodiments of a functional head which may be employed by the tool assembly shown in FIG. 5A.
Figure 5C:
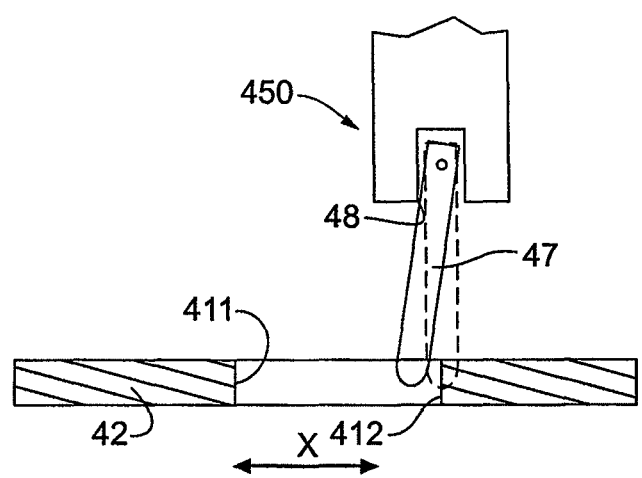

FIG. 5A is another perspective view of tool assembly 400; and FIGS. 5B-C are schematics illustrating alternate embodiments of touch probe 450. FIG. 5A illustrates workpiece 42 located below tool assembly 400, and although not shown, it should be understood that workpiece 42 is supported by, and moved in the X- and Y-directions by press 1000; workpiece 42 includes features 401, 403, which have been formed, for example, by a punch tool of one of tool assemblies 103. According to the illustrated embodiments, probe 450 is positioned in the Z-direction, with respect to workpiece 42, by a pre-programmed ram-stroke A of press 1000, in order to inspect features 401, 403 of workpiece 42, as workpiece 42 is moved, in one or both of the X- and Y-directions. FIG. 5B illustrates a position of probe 450, in the Z-direction with respect to workpiece 42, according to one embodiment of probe 450, and FIG. 5C illustrates another position of probe 450, in the Z-direction with respect to workpiece 42, according to an alternate embodiment. According to the embodiment of FIG. 5B, probe 450 comprises a stylus 46 acting as a switch that closes to send a signal in response to a release of contact between stylus 46 and workpiece 42. According to the embodiment of FIG. 5C, probe includes a stylus 47 acting as a switch that closes to send the signal in response to contact between stylus 47 and workpiece 42.

FIG. 5B shows a first edge 411 of feature 401 having passed under stylus 46 such that contact between probe 450 and a surface 420 of workpiece 42 is released, until workpiece 42 has been moved in the X-direction a distance necessary to bring a second edge 412 of feature 401 beneath stylus 46 such that a tip of stylus 46 rides up over edge 412 and onto surface 420. With reference to FIG. 5B, it should be appreciated that, for the time in which feature 401 passes beneath probe 450, stylus 46 makes electrical contact 48 within probe 450 to send a signal, and that electrical contact 48 is broken when first and second edges 411, 412 of feature 401 pass beneath stylus 46 to lift stylus 46 out of electrical contact 48 within probe 450, as shown by the dashed lines; thus, a duration of the signal, taken into account with the speed in which workpiece 42 is moved in the X-direction, corresponds to a dimension from first edge 411 to second edge 412. Alternately, positions in the X-direction of workpiece 42 may be tracked by the press, in the coordinate system thereof, and coordinated with signals from probe 450 to calculate the dimension from first edge 411 to second edge 412 of feature 401.

FIG. 5C shows probe 450 initially positioned such that a tip of stylus 47 is recessed within feature 401. With reference to FIG. 5C, it should be appreciated that, when workpiece 42 is moved back and forth in the X-direction, to bring edges 411 and 412 into contact with stylus 47, stylus 47 pivots in response to the edge contacts such that electrical contact 48 is made within probe 450; thus, signals corresponding to contacts 48 within probe may be used to determine a dimension between edges 411 and 412, via either of the methods described above. It should be noted that dashed lines in FIG. 5C outline stylus 47 when not in contact with either edge 411, 412 of feature 401.

Active tool of assembly 400 may be similar to that of assemblies 100, 200, in that probe 450 is coupled to a control module, a wireless communications module and a power source, which are all contained in housing first portion 12; an adapter and a reversible coupling, or connector, for example, similar to adapter 240 and connector 35 shown in FIG. 2B, may be included within housing second portion 14 of tool assembly 400 in order to accommodate reversible coupling of different types of probes and/or replacement probes with the electronics and power source for of the active tool. According to alternate embodiments, probe 450 may be part of a compact assembly that is mounted in housing second portion 14 and includes one or more of the aforementioned control module, communications module and power source. Components of commercially available CMM style touch probes, for example, the Mida™ OP32 and the Mida™ E83WA probes available from MARPOSS, may be incorporated by embodiments of the present invention, as well as any other type of inspection probe, for example, laser or optical non-contact trigger probes.

FIG. 6A is an exploded perspective view, including a cut-away section, of a tool assembly 500 including an alternate configuration of housing 10, which contains an active tool employing probe 450, according to some other embodiments of the present invention. FIG. 6A illustrates a functional head assembly 525 including probe 450 and a mounting fixture 505, which holds probe 450 for coupling with bottom surface 214 of housing second portion 14; a functional head adapter 555 plugs into a connector 551 of functional head assembly 525, when assembly 525 is coupled to surface 214, to provide electrical coupling for probe 450. Mounting fixture 505 may be formed from a relatively soft, yet durable material, for example a plastic or silicone rubber so as not to scratch or otherwise deform workpiece 42, if fixture 505 should come into contact with workpiece 42 during the processing thereof, for example, during inspection. FIG. 6A further illustrates housing second portion 14 containing a power source 526 in an upper compartment 546 thereof, and housing first portion 12 containing electronic components, which may be similar to electronics 230 described in conjunction with FIG. 2A. According to the illustrated embodiment, housing first portion 12 can be separated from housing second portion 14 along an upper flange, or lip 524 of housing second portion 14 by unplugging a connector 521 of first portion 12 from a mating connector 541 of second portion 14.

With reference to FIG. 6A, it will be appreciated that connector 521 is coupled to the electronics contained in housing first portion 12, and that mating connector 541 is coupled to power source 526 and to functional head adapter 555, which, in turn, mates with connector 551, so that probe 450 is electrically coupled to power source 526 and to the electronics when all the connectors are appropriately coupled together. Such a modular configuration for housing 10 can allow a maximum flexibility in configuring assembly 500, for example, to select from among various types of functional heads for a given set of electronics, or to select from various sets of electronics for a given type of functional head, or both.

Referring now to FIGS. 6B-C, a modularity of housing 10 is further demonstrated. FIG. 6B illustrates a camera 50 mounted in mounting fixture 505 to form a functional head assembly 550 for integration into housing second portion 14, similar to assembly 525; camera 50 may be used as an alternative to, or in addition to, either bar code reader 36 or touch probe 450 for collection of information from a workpiece. FIG. 6C illustrates, for integration into housing second portion 14, functional head assembly 325 including print head 32, which was previously described in conjunction with FIG. 3E. According to some embodiments of the present invention, a common housing second portion 14 containing power source 526 and adapter 555/314 can be used with any compatible functional head assembly, for example, any of assemblies 525, 550, and 325, in conjunction with either a common, or universal set of electronics contained in housing first portion 12, or individual sets of electronics, each contained in respective housing first portions 12 and tailored for a particular type of functional head.

FIG. 6D is a perspective view of a configuration of a functional head assembly 325' which may be employed by alternate embodiments of the present invention. FIG. 6D illustrates functional head assembly 325' being formed as a housing second portion 14' into which a printing head 205 is integrated and which may be coupled to housing first portion 12, for example, configured as shown in FIGS. 6A-C. Like housing second portion 14, as shown in FIGS. 6A-C, housing second portion 14' may contain a power source coupled to printing head 205 and includes a connector for reversible attachment to connector 521 of housing first portion 12 of FIGS. 6A-C, for electrical coupling of the electronics contained in housing first portion 12 with the power supply and printing head 205.

Figure 7:
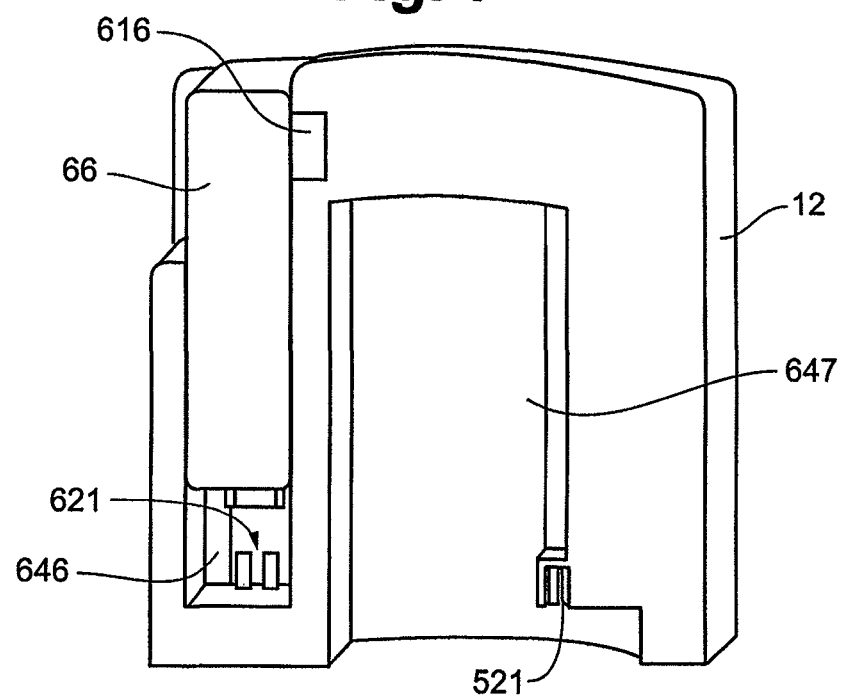
FIG. 7 is a section view through a portion of a tool assembly, according to further embodiments of the present invention.

FIG. 7 is a section view through a portion of a tool assembly, according to further embodiments of the present invention. FIG. 7 illustrates another embodiment of housing first portion 12, which includes a first compartment 646 to contain and facilitate coupling of a battery 66, which may form all or a portion of a power source for the associated active tool, and a second compartment 647 to contain and facilitate coupling of a set of electronics (not shown) for the active tool. According to the illustrated embodiment, when battery 66 is fully inserted in compartment 646, a connector 621 electrically couples battery to the rest of the active tool; an optional spring-loaded tab 616 may further secure battery 66 in compartment 646 when battery 66 is fully inserted and coupled via connector 621. The FIG. 7 embodiment of housing first portion 12 further includes connector 521 for coupling battery 66 and electronics (not shown) to the functional head of the active tool contained, for example, in housing second portion 14 (FIGS. 6A-C), when connector 521 is plugged into mating connector 541 of housing second portion 14.

According to alternate embodiments, the power source for the active tool need not be contained in the same housing that contains the active tool. One example of a tool assembly, according to these alternate embodiments, includes a first housing, which contains the active tool, whose components may be arranged as shown in any of the embodiments described herein, and a second housing, which contains a power source for the active tool. The second housing may be mounted adjacent to the active tool in a mounting assembly of the press, for example, in an adjacent turret bore. Of course a separate power source may be mounted in any other suitable manner within the press, according to other examples of these embodiments. The separate power source, whether contained in the second housing or otherwise mounted in the press, may be coupled to the active tool, which is contained in the first housing, via a lead wire and connector; for example, with reference back to FIG. 2D, housing second portion 12 (of the housing containing the active tool) may include a connector, such as connector 22, to provide for coupling with a 9-12 V power plug of the lead wire of the power source.

FIG. 8 is a perspective view, including a cut-away section, of another tool assembly 700, according to yet further embodiments of the present invention; tool assembly 700 is compatible for mounting in an alternative type of ram-driven press, for example, Trumpf-style press known to those skilled in the art, that brings tool assemblies, held in a cartridge, one at a time from a rail into a working position where each assembly, in turn, is coupled to a ram of the press. FIG. 8 illustrates tool assembly 700 including an active tool, which is contained by a housing 70 that makes tool assembly 700 interchangeable, within a mounting assembly of the Trumpf-style press; housing 70 includes a first portion 72 and a second portion 74 which together form a compartment 724 containing the active tool, which includes a functional head 75 and electronics 730 supporting functional head 75, and a power source 76 powering electronics 730 and functional head 75. FIG. 8 further illustrates housing second portion 74 including a bottom surface 714, through which an aperture 704 is formed, and housing first portion 72 including a shank 710 and a striking surface 71; shank 710 includes an undercut 701 facilitating an interlocking coupling of the ram thereto. According to the illustrated embodiment, functional head 75 is oriented to perform a function, through aperture 704, on a workpiece supported by a table of the press when assembly 700 is coupled to the ram in the working position of the press. According to the illustrated embodiment, functional head 75 is a printer cartridge, but any of the other types of functional heads, previously described, may be incorporated by the active tool of assembly 700.

Electronics 730, like electronics 230, previously described, are preferably in a form of a single board computer (SBC) and include a microprocessor, or microcontroller, for example, employing RISC architecture such as X-scale ARM, along with a memory, optional data storage, and an optional communications module 79. Optional communication module 79 may be a wireless transceiver, which includes an embedded antenna for reception and transmission of radiofrequency (RF) signals, for example, via WiFi, Bluetooth or Zigbee, as previously described, in order to re-charge power source 76 and/or to enhance various functions of functional head 75, for example, for communication of programming instructions to control functional head 75 and/or for transfer of data collected by head 75 to a data analysis system. Alternately the modules of electronics 730 may be integrated into a single chip wireless microcontroller, for example, one of the JN513x family supplied by Jennic.

FIG. 8 further illustrates optional connectors 72, 73 providing a reversible connection for lead wires to charge power source 76 and/or transfer information, such as data or programming instructions; according to those embodiments, which include wireless communications module 79 and connectors 72, 73, connectors 72, 73 provide a backup to communications module 79, while, according to other embodiments that do not include wireless communications module 79, connectors 72, 73 are the sole provider for data transmission and power source recharging. According to some embodiments, the cartridge, which holds tool assembly 700 at the rail of the press, includes a microprocessor mounted thereon, which microprocessor functions to program the active tool of assembly 700, either via connector 73 or via wireless communication.

Although not shown, some embodiments of assembly 700 further include a switch, preferably mounted on housing 70 so that a movement of housing 70, in the Z-direction, in response to a ram-stroke B of the press, triggers the switch; the switch for tool assembly 700 may be similar to any of the switch embodiments previously described for other tool assemblies, for example assembly 200. Alternately, a control center of the press can send a signal, for example, received by communications module 79, to activate functional head 75, and tool assembly 700 need not include such a switch.

Turning now to FIG. 9, some methods of the present invention will be described. FIG. 9 provides an outline of steps which may be performed to integrate into a processing of a workpiece, in a ram-driven press, active tool assemblies, for example, any of the embodiments of the present invention that are described herein.

FIG. 9 illustrates a first series 810 of steps which may be undertaken to set up the press, wherein steps 802 and 806 involve loading both passive and active tool assemblies into the press, and steps 801, 803 and 807 encompass programming the press to move the workpiece beneath both passive and active tools, and to deliver an appropriate ram stroke to both the passive and active tools for the proper processing of the workpiece. It should be noted that any of programming steps 801, 803, 807 may either precede or follow one or both of loading steps 802, 806. Series 810 may further include one or both of steps 804 and 805, which are optional. According to step 804, a passive tool assembly is removed from a mounting position in the press so that the active tool assembly may be loaded into the same mounting position; and, according to step 805, a functional head is coupled to the active tool assembly, by means of a connector that allows reversible coupling of the functional head to the active tool, to replace another functional head, which has been removed, and which may be of a same type or a different type.

FIG. 9 further illustrates a second series 820 of steps devoted to preparing the active tool for some methods and embodiments of the present invention. According to step 821 of series 820, if the active tool is powered by a re-chargeable power source, and the power has been depleted, the power source is charged; charging may be performed wirelessly, for example, via RF transmission, and/or via a lead wire reversibly coupled to a connector of the tool assembly. According to step 822, if the active tool is programmable, the active tool is programmed for carrying out a particular operation, via the functional head thereof; like re-charging, programming may be performed via wireless transmission and/or via a lead wire reversibly coupled to a connector of the tool assembly. It should be noted that steps 821, 822 in series 820 may be performed on the active tool either before or after any or all of the steps in series 810.

Finally, FIG. 9 illustrates step 830, wherein a surface of the workpiece is formed by the passive tool, for example, via punching or stamping, and step 840, wherein the active tool performs an operation on the workpiece, for example, inspection, marking, or some other type of forming operation, as described herein. It should be noted that performing the operation, per step 840, may including transferring data collected by the functional head of the active tool to a data analysis system. According to those embodiments of the present invention which are employed by a turret-style press, each of the active and passive tool assemblies remain in initial mounting positions of an upper turret during steps 830 and 840, and a rotation of the turret brings the active and passive tools, sequentially, into the working position of the press; while, according to those embodiments of the present invention which are employed by a Trumpf-style press, the press moves each of the passive and active tool assemblies, in turn, from an initial mounting position, along the rail, into a working position to carry out steps 830, 840, respectively, in sequence. It should be noted that steps 830 and 840 may take place in any order with respect to one another.

FIG. 10A is a perspective view, in cross-section, of a portion of a tool assembly 900, according to another category of embodiments of the present invention, which accommodates an active tool that includes a functional head to perform a forming operation on a workpiece, for example, supported by a table of a turret-style ram-driven press; examples of some functional heads compatible with assembly 900 will be described below, in conjunction with FIGS. 11, 12 and 13A-B. Active tool functional heads, according to this other category of embodiments, perform other types of operations, which, although these other operations result in plastic deformation of the workpiece, are distinct from a ram-driven forming operation carried out by a passive tool, such as punching or stamping.

FIG. 10A illustrates tool assembly 900 including housing first portion 12, from which a cover 912, which is shown in cross-section in FIG. 10B, has been removed to show batteries 96, which form a power source for the active tool, along with internal lifter springs contained therein. FIG. 10B illustrates how batteries 96 are mounted in cover 912, and receptacles 914 to retain springs 904. FIG. 10A further illustrates housing second portion 14 of tool assembly 900 containing electronics 930, for example, similar to electronics 230, previously described, or in the form of a wireless microcontroller from the aforementioned JN513x family supplied by Jennic, coupled, via a DC to DC converter 906, to batteries 96, and a rotary drive 940, for example, an electrical motor, coupled to electronics 930; drive 940 is shown coupled to a gear box 942, which includes a drive gear 944; a functional head, for example, any of those described below in conjunction with FIGS. 11-13A-B, may be coupled to drive gear 944 such that the functional head will extend away from gear box 942 and toward bottom surface 214. According to some embodiments of the present invention, drive gear 944 includes encoder pickups, to function with a rotary encoder mounted in proximity therewith, for example, one of the KX21 series of Incremental Rotary Optical Kit Encoders available from BEI Technologies, Inc.

Figure 10C:
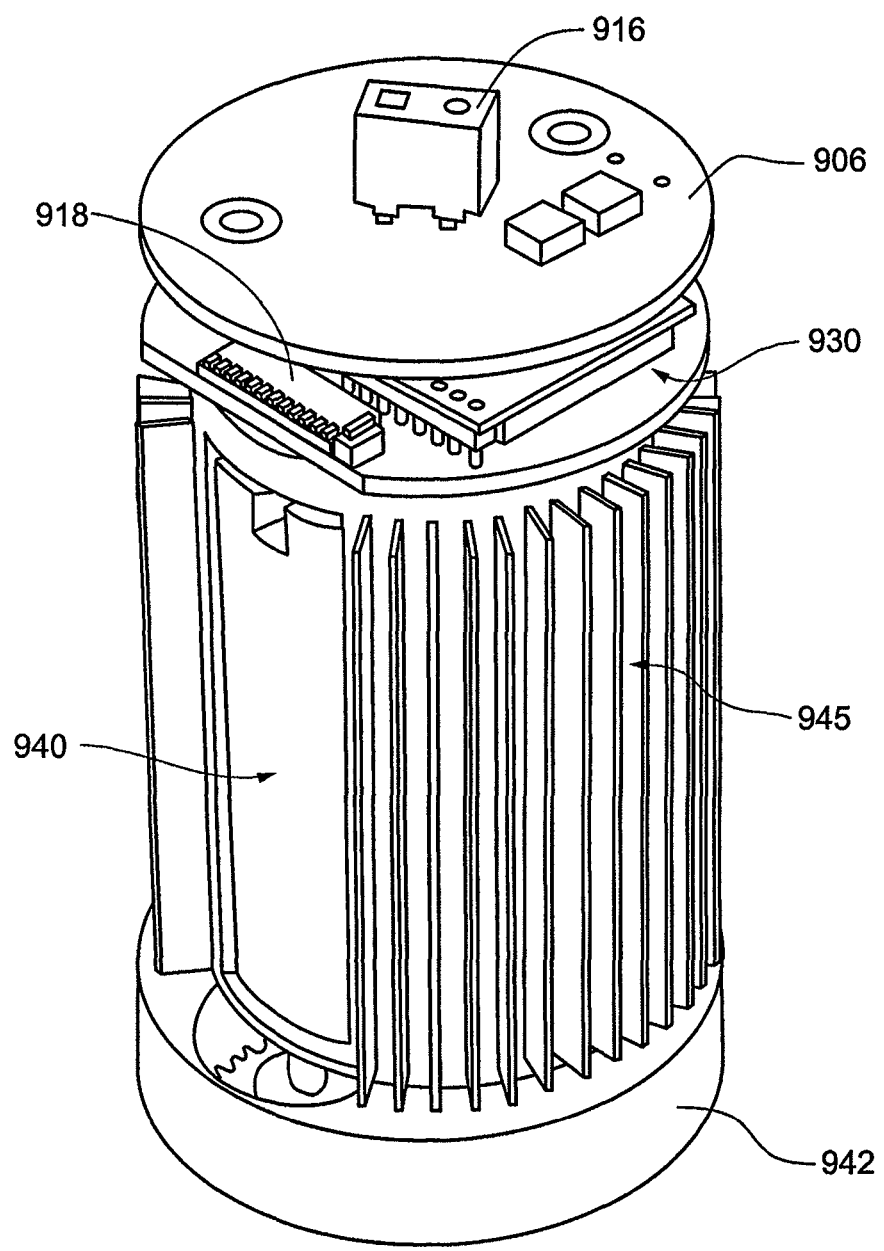
FIG. 10C is a perspective view of a portion of an active tool of the tool assembly of FIG. 10A, according to some embodiments.

FIG. 10C is a perspective view of the aforementioned components, removed from housing second portion 14 of assembly 900, wherein a plurality of heat sink fins 945, disposed about drive 940, a twelve-pin connector 918, for coupling with lead wires of the encoder or other drive components, and a connector 916, for coupling converter 906 to batteries 96, may be seen. With reference back to FIG. 10B a connector 95 for mating with connector 916 is shown coupled to cover 912 of housing first portion 12. According to some embodiments of the present invention, connectors 95 and 916 provide for reversible coupling between the power source, contained in housing first portion 12, and the active tool, contained in housing second portion 14, so that the active tool may be separated from the power source for exchange with another active tool and/or for repair and/or maintenance thereof. Although not shown, assembly 900 may further include one or more external connectors for reversible coupling of lead wires to transmit information, for example, programming instructions and/or data, to and/or from the active tool and/or to charge the power source for the active tool; such connectors may not be necessary for those embodiments of assembly 900 that include the communications module for wireless transmission of information.

With reference back to FIG. 10A it may be seen that housing first portion 12 of assembly 900 further includes a striking surface 91 and an optional threaded feature 920 mating with a mounting fixture 947 that holds the aforementioned components of the active tool contained in housing second portion 14. Referring to FIG. 1, in conjunction with FIG. 10A, it may be appreciated that, when assembly 900 is substituted for assembly 100, and bottom surface 214 of housing second portion 12 contacts a surface of workpiece 2, a continued force of ram stroke A on striking surface 91 of housing first portion 12 causes lifter springs 904 to compress, thereby allowing the functional head, coupled to gear box 942, to extend beyond opening 16 and pass through the surface of workpiece 2 on which bottom surface 214 rests, in order to perform a forming operation on workpiece 2. According to an alternate embodiment, ram stroke A does not bring bottom surface into contact with workpiece 2, rather, ram stroke A fully compresses lifter springs 3 in turret bore 5 to cause internal lifter springs 904 to compress so that the functional head can extend out through opening 16 to perform a function on workpiece, for example, the function described below in conjunction with FIGS. 13A-B. Optional threaded feature 920, may either allow for adjustment of a fixed position of the active tool with respect to housing first portion 12, according to various types of forming process and/or various functional head lengths, or may control a dynamic travel of the coupled functional head with respect to housing first portion 12.

Figure 11:
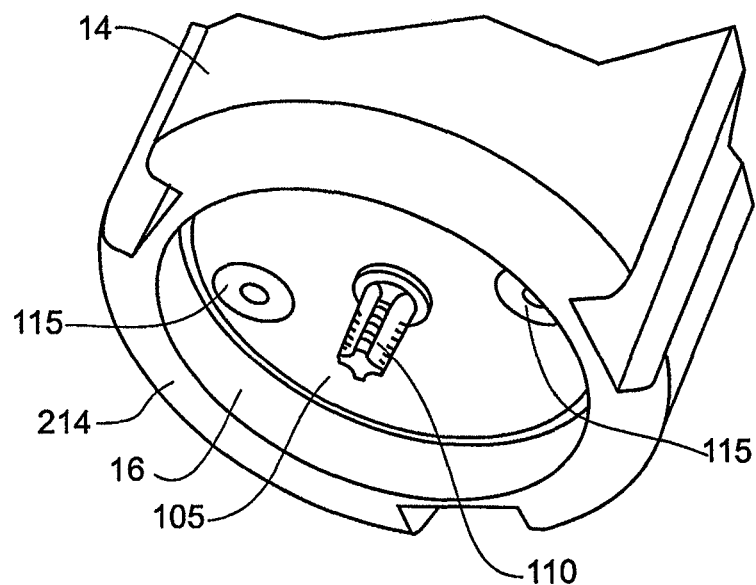
FIGS. 11 and 12 are perspective views of two types of functional heads, which may be employed by the tool assembly of FIGS. 10A-C.
Figure 12:
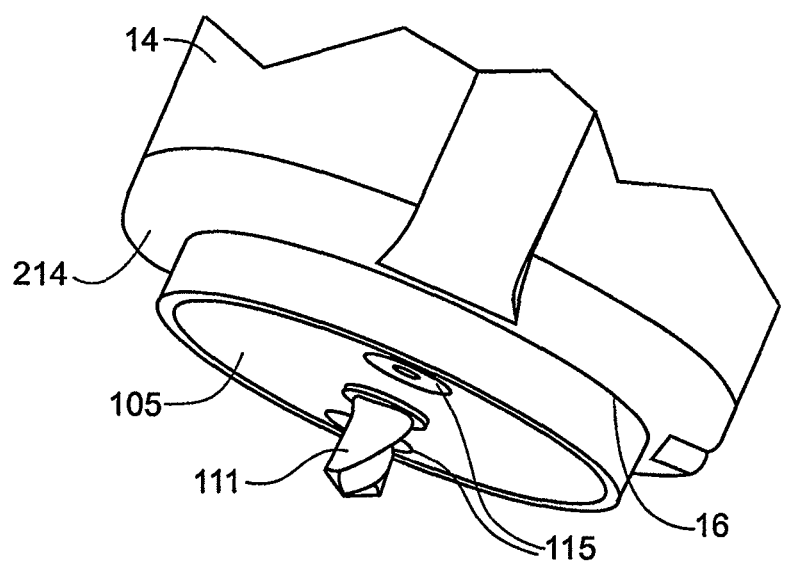

FIGS. 11 and 12 are perspective views of two types of functional heads: a tapping bit 110 and a drilling bit 111, respectively. FIGS. 11 and 12 illustrate bits 110, 111 each coupled to the active tool of FIGS. 10A-C by a mounting plate 105 secured by fasteners 115; a shaft of each bit 110, 111 extends through a bore 94 (FIG. 10A) to couple with drive gear 944. In FIG. 11, bit 110 is shown recessed within opening 16 of housing second portion 14, as would be an initial condition, prior to contact with a surface of a workpiece, for example, workpiece 2 (FIG. 1); while in FIG. 12, bit 111 is shown protruding out from opening 16, as would be a condition when a ram stroke, for example, ram stroke A (FIG. 1), forces bottom surface 214 against the workpiece and internal lifter springs 904 compress. According to the illustrated embodiments, rotary drive 940 rotates bits 110, 111 in conjunction with the controlled ram stroke of the press in order to perform a cutting operation on the workpiece.

Figure 13A:
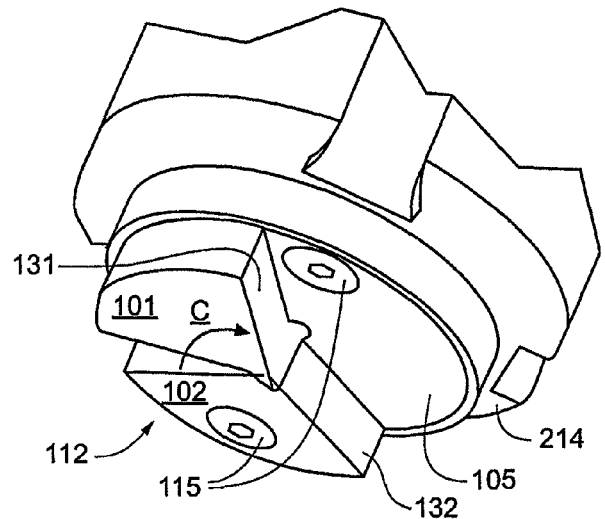
FIGS. 13A-B are perspective views of a functional head and a workpiece formed by the functional head, according to some embodiments of the present invention.
Figure 13B:
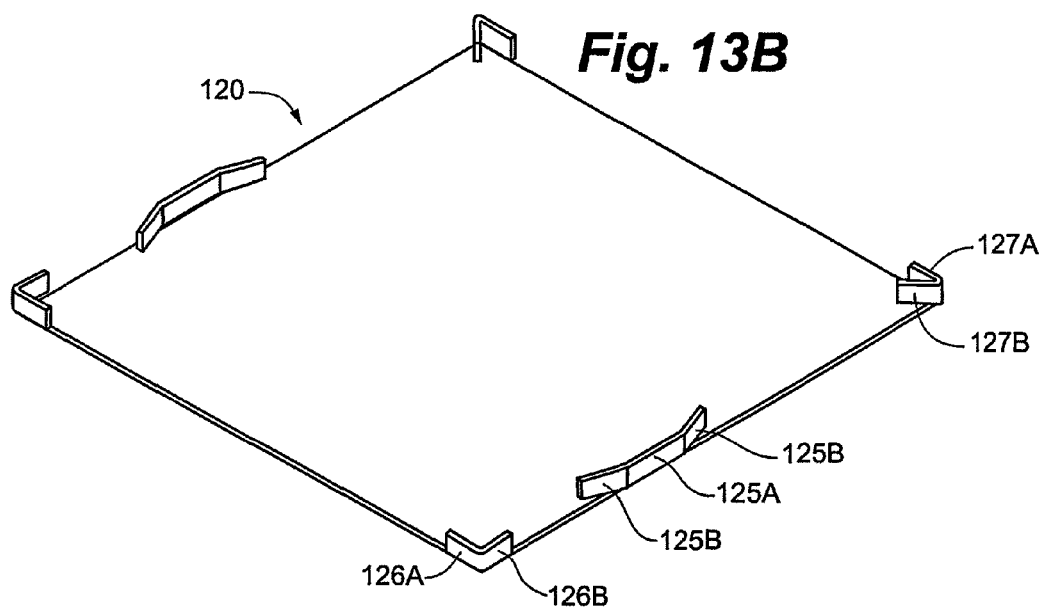

FIG. 13A is a perspective view of another type of functional head: a rotary bending apparatus 112. FIG. 13A illustrates bending apparatus 112 coupled to the active tool of FIGS. 10A-C by a mounting plate 105 secured by fasteners 115. FIG. 13A further illustrates bending apparatus including a rotatable part 101, that includes a shaft extending through bore 94 (FIG. 10A) to couple with drive gear 944, and a fixed part 102, which is fixed by one of fasteners 115; rotary drive 940 of assembly 900 rotates part 101, per arrow C, from an initial position where surfaces 131, 132 of parts 101, 102, respectively, are approximately co-planar to a position where surfaces 131, 132 are at an angle with respect to one another. FIG. 13B is perspective view of a workpiece 120 having features which may be formed by bending apparatus 112. According to the illustrated embodiment, workpiece 120 is positioned, via the table of the press, with respect to apparatus 112, which extends from tool assembly 900 mounted in the press, such that surfaces 131, 132 of parts 101, 102, respectively interface with each of surfaces 125A,B, 126A,B, 127A, B, in turn, of turned up edges of workpiece 120. Prior to bending of surfaces 125A, 126A and 127A, as shown in FIG. 13B: when surface 132 is against surface 125A, surface 131 is against one of surfaces 125B and moves, per arrow C, to a position forming an obtuse angle with surface 132 in order to form the illustrated bend between surfaces 125A and 125B; when surface 132 is against surface 126A, surface 131 is against surface 126B and moves, per arrow C, to a position forming a right angle with surface 132 in order to form the illustrated bend between surfaces 126A and 126B; when surface 132 is against surface 127A, surface 131 is against surface 126B and moves, per arrow C, to a position forming an acute angle with surface 132 in order to form the illustrated bend between surfaces 127A and 127B.

In the foregoing detailed description, the invention has been described with reference to specific embodiments. However, it may be appreciated that various modifications and changes can be made without departing from the scope of the invention as set forth in the appended claims. For example, although each embodiment is described as an assembly performing a single function, it should be understood that the invention is not so limited and that other embodiments of the present invention encompass assemblies, such as multi-tool assemblies, which employ a plurality of functional heads within a single tool housing. According to one multi-tool example, a first compartment in a tool housing may contain a printing head, a second compartment a forming head, and a third an information collection head, which may each be operated, in turn, from the single tool housing, for example, in an indexing station of any type of press. Furthermore, although embodiments of the present invention have been described as functioning in a particular orientation within an X, Y, Z coordinate system, it should be understood that the scope of the invention is not so limited and embodiments of the present invention may be oriented in any suitable manner.

We claim:
1. A tool assembly for a ram-driven press, the assembly comprising:
    an active tool comprising:
        a microprocessor; and
        a functional head coupled to the microprocessor, the functional head comprising a printer cartridge; and
    a housing containing the active tool, the housing making the tool assembly interchangeable, in a mounting assem- bly of the press, with a tool assembly including a passive forming tool, the housing, when mounted in the mounting assembly, moving in response to a ram stroke of the press;

wherein the functional head is oriented in the housing so as to perform an operation on a workpiece supported in the press.

2. The tool assembly of claim 1, further comprising a power source coupled to the active tool.

3. The tool assembly of claim 1, wherein the functional head is configured to be activated after application of force on an upper surface of the housing and upon the housing being moved proximate to the workpiece.

4. The tool assembly of claim 3, wherein the upper surface of the housing comprises a striking surface.

5. The tool assembly of claim 3, wherein the housing includes a switch mounted thereto, the switch being triggered to activate the functional head when moved within a predetermined proximity of the workpiece.

6. A tool assembly for a machine for forming workpieces, the assembly comprising:
    an active tool comprising a functional head and a microprocessor, the functional head being coupled to the microprocessor;
    a power source, the power source being electrically coupled to the microprocessor for powering the functional head; and
    a housing containing the active tool, the housing making the tool assembly configurable in a mounting assembly of the machine, the housing including a switch mounted thereto, the switch configured to activate the functional head after, application of a force onto an upper surface of the housing;
    wherein the functional head is oriented in the housing so as to perform an operation on a workpiece supported in the machine, and wherein the switch comprises a proximity switch and is triggered by a predetermined proximity of the switch to the workpiece as a result of the force applied onto the housing upper surface.

7. The tool assembly of claim 6, wherein the upper surface of the housing is movable downward, wherein the force applied onto the upper surface of the housing is derived from a ram stroke of the machine.

8. The tool assembly of claim 6, wherein the housing further contains the power source, and further comprising a connector mounted to the housing and coupled to the power source, the connector providing for reversible connection of a lead wire for charging the power source.

9. The tool assembly of claim 6, wherein the housing makes the tool assembly interchangeable with a further tool assembly of the machine, the further tool assembly including a passive forming tool, and wherein the tool assembly with the active tool further comprises another housing containing the power source, the other housing making the power source a replaceable unit for the tool assembly.

10. The tool assembly of claim 6, wherein:
    the housing includes a first portion and a second portion, the first portion containing the microprocessor of the active tool and including a connector coupled to the microprocessor, and the second portion containing the functional head of the active tool and including a mating connector coupled to the functional head, the mating connector for reversible coupling with the connector of the first portion; and
    the housing first and second portions are separable from one another to decouple the functional head from the microprocessor.

11. The tool assembly of claim 10, wherein the first portion of the housing contains the power source, and wherein the connector of the first portion is further coupled to the power source.

12. The tool assembly of claim 6, wherein the active tool further comprises a wireless communications module coupled to the microprocessor for receiving transmission of programming instructions.

13. The tool assembly of claim 6, wherein the housing includes an opening through which the functional head of the active tool performs the operation, and the functional head is fixed at a position recessed within the opening of the housing.

14. The tool assembly of claim 6, wherein the operation performed by the functional head comprises marking the workpiece.

15. The tool assembly of claim 6, wherein the operation performed by the functional head comprises collecting information from the workpiece and the active tool further comprises a wireless communications module coupled to the functional head for transmitting the information therefrom.

16. The tool assembly of claim 6, wherein the operation performed by the functional head comprises collecting information from the workpiece and the active tool further comprises a memory coupled to the functional head, the memory storing the data collected by the functional head.

17. The tool assembly of claim 6, wherein the function performed by the functional head is a forming operation.

18. The tool assembly of claim 17, wherein the forming operation is one of: bending and cutting.

19. The tool assembly of claim 6, wherein the functional head comprises a printer cartridge.

20. The tool assembly of claim 19, wherein:
    the housing includes a first portion containing a microprocessor, and a second portion containing the printer cartridge and including an opening through which the printer cartridge prints on the workpiece; and
    when the housing is mounted in a mounting assembly of the press, the first portion extends above the mounting assembly, and the second portion extends below the mounting assembly.

21. The tool assembly of claim 20, wherein the printer cartridge is fixed at a position recessed within the opening of the second portion.

22. The tool assembly of claim 6, wherein the functional head comprises at least one of: a touch probe, a laser, and a camera.

23. The tool assembly of claim 6, wherein the proximity switch comprises a reflective optical sensor.

24. A tool assembly for a ram-driven single station press, the assembly comprising:
    an active tool comprising a functional head and a microprocessor, the functional head being coupled to the microprocessor;
    a power source, the power source being electrically coupled to the microprocessor for powering the functional head; and
    a housing containing the active tool, the housing making the tool assembly interchangeable, in a mounting assembly of the ram-driven single station press, with a further tool assembly, the housing, when mounted in the mounting assembly, moving in response to a ram stroke of the press, the housing including an opening through which the functional head performs an operation on a workpiece supported in the ram-driven press;
    wherein the functional head comprises a printer cartridge that is fixed at a position recessed within the opening of the housing, wherein the functional head is activated via application of a force onto an upper surface of the housing, and wherein the force is derived from a ram stroke of the machine.

25. The tool assembly of claim 24, wherein the housing further contains the power source, and further comprising a connector mounted to the housing and coupled to the power source, the connector providing for reversible connection of a lead wire for charging the power source.

26. The tool assembly of claim 24, wherein the tool assembly further comprises another housing containing the power source, the other housing making the power source a replaceable unit for the tool assembly.

27. The tool assembly of claim 24, wherein the housing includes a switch mounted thereto and further configured to activate the functional head, wherein the switch is triggered by movement of the housing in response to a ram stroke of the press.

28. The tool assembly of claim 27, wherein the switch comprises a proximity switch and is triggered by a predetermined proximity of the switch to the workpiece.

29. The tool assembly of claim 28, wherein the proximity switch comprises a reflective optical sensor.

30. The tool assembly of claim 24, wherein the switch comprises an accelerometer and the switch is triggered by a deceleration of a movement of housing in response to the ram stroke.

31. The tool assembly of claim 24, further comprising a connector mounted to the housing and coupled to the power source, the connector providing for reversible connection of a lead wire for charging the power source.

32. The tool assembly of claim 24, wherein:
the housing includes a first portion and a second portion, the first portion containing the microprocessor of the active tool and including a connector coupled to the microprocessor, and the second portion containing the functional head of the active tool and including a mating connector coupled to the functional head, the mating connector for reversible coupling with the connector of the first portion; and
wherein the housing first and second portions are separable from one another to decouple the functional head from the microprocessor.

33. The tool assembly of claim 32, wherein the connector of the first portion is further coupled to the power source.

34. The tool assembly of claim 24, wherein the active tool further comprises a wireless communications module coupled to the microprocessor for receiving transmission of programming instructions.

35. The tool assembly of claim 24, wherein the operation performed by the functional head comprises marking the workpiece.

36. A tool assembly for marking objects, the assembly comprising:
an active tool comprising a functional head and a microprocessor, the functional head being coupled to the microprocessor;
a power source, the power source being electrically coupled to the microprocessor for powering the functional head; and
a housing containing the active tool, the housing including an opening through which the functional head performs an operation on an object, the housing including a switch mounted thereto, the switch configured to activate the functional head after application of a force onto an upper surface of the housing;
wherein the functional head comprises a printer cartridge that is fixed at a position within the opening of the housing, and wherein the switch comprises a proximity switch and is triggered by a predetermined proximity of the switch to the object.

37. The tool assembly of claim 36, wherein the housing further contains the power source, and further comprising a connector mounted to the housing and coupled to the power source, the connector providing for reversible connection of a lead wire for charging the power source.

38. The tool assembly of claim 36, wherein the active tool further comprises another housing containing the power source, the other housing making the power source a replaceable unit for the tool assembly.

39. The tool assembly of claim 36, wherein:
the housing includes a first portion and a second portion, the first portion containing the microprocessor of the active tool and including a connector coupled to the microprocessor, and the second portion containing the functional head of the active tool and including a mating connector coupled to the functional head, the mating connector for reversible coupling with the connector of the first portion; and
the housing first and second portions are separable from one another to decouple the functional head from the microprocessor.

40. The tool assembly of claim 39, wherein the first portion of the housing contains the power source, and wherein the connector of the first portion is further coupled to the power source.

41. The tool assembly of claim 36, wherein the active tool further comprises a wireless communications module coupled to the microprocessor for receiving transmission of programming instructions.

42. The tool assembly of claim 36, wherein the proximity switch comprises a reflective optical sensor.

* * * * *